United States Patent [19]

Magier et al.

[11] Patent Number: 4,808,803

[45] Date of Patent: Feb. 28, 1989

[54] SECURITY SYSTEM

[75] Inventors: Louis H. Magier, Chatsworth; Hei-Pen Yang, Van Nuys; John Hor, Temple City, all of Calif.

[73] Assignee: Figgi International, Inc., Richmond, Va.

[21] Appl. No.: 89,342

[22] Filed: Aug. 24, 1987

[51] Int. Cl.[4] .................... G06K 5/00

[52] U.S. Cl. .................... 235/382; 235/380; 235/487

[58] Field of Search .................... 235/380, 382, 487

[56] References Cited

U.S. PATENT DOCUMENTS 4,677,284 6/1987 Genest .................... 235/382

*Primary Examiner*—Harold I. Pitts

*Attorney, Agent, or Firm*—Knobbe, Martens, Olson & Bear

[57] ABSTRACT

A security system that grants access to authorized persons includes a central controller, insertion-type card readers, proximity-type card readers, and an interface module that interfaces between the central controller and the proximity-type readers in order to make the proximity-type readers appear to the central controller as though they were insertion-type readers. When indentification data is presented to one of the card readers in the system, the identification data is passed to the central controller, which then checks its memory to determine whether the identification data identifies an authorized person. If the identification data is present in the memory of the central controller, then the person is authorized to enter, and the central controller sends a command to the approximate card reader instructing it to unlock the door that the card reader controls.

7 Claims, 27 Drawing Sheets

PR MULTIPLEXER FORMAT

| | | | | | | | |
|---|---|---|---|---|---|---|---|
| BYTES | 1 | 2 | 1 | 1 | 0-6 | 1 | 1 |
| | STX | LENGTH | DEV# | FUNC | DATA | CSUM | ETX |
| FIELD | 1 | 2 | 3 | 4 | 5 | 6 | 7 |

114

| FUNCTION TABLE | | |
|---|---|---|
| FUNCTION CODE | DESCRIPTION | DATA BYTES |
| 64 | ID + SYS CODE | 5 |
| 66 | RESET PR | 0 |

Fig. 8

FEATURE MODULE FORMAT

| | | | | | | |
|---|---|---|---|---|---|---|
| BYTES | 1 | 1 | 1-2 | 0-5 | 1 | 1 |
| | SYNC | DEV # | COMM/RESP | DATA | CRC | CRC |
| FIELD | 1 | 2 | 3 | 4 | 5 | 6 |

116

| COMMANDS TO FEATURE MODULE | | |
|---|---|---|
| CODE | DESCRIPTION | DATA |
| 99, 03 | GO | – |
| 99, 05 | NO-GO | – |
| 99, 35 | LOCK | – |
| 99, 33 | UNLOCK | – |
| 99, 30 | CHECK IDEK | 5 |

118

| RESPONSES FROM FEATURE MODULE | | |
|---|---|---|
| CODE | DESCRIPTION | DATA |
| 50 | CORRECT IDEK | 5 BYTES |
| 49 | WRONG IDEK | 5 BYTES |
| 90 | DOOR LOCKED | – |
| 93 | DOOR UNLOCKED | – |

Fig. 9

HOST TRANSMIT FORMAT

| BYTES | 1/2 | 1/2 |
|---|---|---|
| | FUNC | DEV # |

120

Fig. 10a

| XMIT FUNCTION TABLE | |
|---|---|
| CODE | DESCRIPTION |
| A | GO |
| 9 | NO-GO |
| B | LOCK |
| C | UNLOCK |

HOST RECEIVE FORMAT

| BYTES | 1/2 | 1/2 | 1/2 | 0-3 1/2 |
|---|---|---|---|---|
| | TYPE | DEV # | CODE | DATA |
| FIELD | 1 | 2 | 3 | 4 |

| | RECEIVE FUNCTION TABLE | | |
|---|---|---|---|
| TYPE | CODE | DESCRIPTION | DATA |
| 4 | 0 | ID + SYS CODE | 3 1/2 |
| 5 | 0 | CORRECT IDEK | 3 1/2 |
| 5 | F | WRONG IDEK | 3 1/2 |
| 4,5 | 3 | DOOR LOCKED | — |
| 4,5 | 4 | DOOR UNLOCKED | — |

122

Fig. 10b

| HOST → FM TRANSLATION TABLE | | |
|---|---|---|
| DESCRIPTION | HOST → PPC | PPC → FM |
| GO | A | 99, 03 |
| NO-GO | 9 | 99, 05 |
| LOCK DOOR | B | 99, 35 |
| UNLOCK DOOR | C | 99, 33 |
| CHECK IDEK | 4 | 99, 30 |

126

| FM → HOST TRANSLATION TABLE | | |
|---|---|---|
| DESCRIPTION | FM → PPC | PPC → HOST |
| CORRECT IDEK | 50 | 0 |
| WRONG IDEK | 49 | F |
| DOOR LOCKED | 90 | 3 |
| DOOR UNLOCKED | 93 | 4 |

128

| PR MUX → HOST TRANSLATION TABLE | | |
|---|---|---|
| DESCRIPTION | MUX → PPC | PPC → HOST |
| ID + SYS CODE | 64 | 0 |

146

| STATE TABLE | |
|---|---|
| STATE | DESCRIPTION |
| H0 | OUT OF SYNC |
| H1 | WAIT FOR HEADER CHAR |
| H2 | WAIT FOR MSG-LENGTH CHAR |
| H3 | WAIT FOR EOM (KNOWN LENGTH) |
| H4 | WAIT FOR EOM (UNKNOWN LENGTH) |

148

| STATE TRANSITION TABLE | | |
|---|---|---|
| CURRENT STATE | INPUT | NEXT STATE |
| H0 | CHAR | H0 |
| H0 | TIMEOUT | H1 |
| H1 | TIMEOUT | H1 |
| H1 | 1-CHAR MSG | H1 |
| H1 | CHARS (KNOWN) | H2 |
| H1 | CHARS (UNKNOWN) | H4 |
| H2 | TIMEOUT | H1 |
| H2 | CHAR | H3 |
| H3 | TIMEOUT | H1 |
| H3 | CNT = 0 | H1 |
| H3 | CHAR | H3 |
| H4 | TIMEOUT | H1 |
| H4 | CHAR | H4 |

MXCOM (RECEIVE)

152

| STATE TABLE | |
|---|---|
| STATE | DESCRIPTION |
| R0 | WAIT FOR SYNC/STX |
| R1 | WAIT FOR STX |
| R2 | WAIT FOR ETX |
| R3 | WAIT FOR IDLE LINE |

154

| STATE TRANSITION TABLE | | |
|---|---|---|
| CURRENT STATE | INPUT | NEXT STATE |
| R0 | SYNC | R1 |
| R0 | STX | R2 |
| R0 | RCV ERR | R3 |
| R1 | STX | R2 |
| R1 | RCV ERR | R3 |
| R2 | EOM | R0 |
| R2 | RCV ERR | R3 |
| R3 | LINE IDLE | R0 |

MXCOM (TRANSMIT)

156

| STATE TABLE | |
|---|---|
| STATE | DESCRIPTION |
| X0 | TRANSMIT DISABLED |
| X1 | WAIT FOR TRANSMIT REQUEST |
| X2 | WAIT FOR ACK |
| X3 | WAIT FOR EOT |

160

| STATE TRANSITION TABLE | | |
|---|---|---|
| CURRENT STATE | INPUT | NEXT STATE |
| X0 | LINE IDLE | X1 |
| X1 | EOT | X0 |
| X1 | XMT REQ | X2 |
| X2 | EOT | X0 |
| X2 | NAK/CAN | X1 |
| X2 | ACK | X3 |
| X3 | EOT | X0 |
| X3 | INVALID ECHO | X1 |

FCOM

164

| STATE TABLE | |
|---|---|
| STATE | DESCRIPTION |
| S0 | LINE IDLE |
| S1 | TRANSMIT MESSAGE |
| S2 | RECEIVE MESSAGE |
| S3 | ERROR HANDLER |
| S4 | TRANSMIT NAK |

166

| STATE TRANSITION TABLE | | |
|---|---|---|
| CURRENT STATE | INPUT | NEXT STATE |
| S0 | XMIT REQUEST | S1 |
| S1 | MSG XMITTED | S2 |
| S2 | MSG RECD | S0 |
| S2 | TIMEOUT | S0 |
| S2 | ACIA ERR | S3 |
| S3 | 3 RETRIES | S0 |
| S3 | ERR RETRY | S4 |
| S4 | NAK XMITTED | S2 |

358

| ID CODE TRANSLATION | |
|---|---|
| PROX ID | INSERTION ID |
| 0001F | 01A3E |
| 000A3 | 24C10 |
| 77735 | 0AA75 |
| 777A3 | DE024 |

Fig. 23

208

| FEATURE MODULE TABLE | | |
|---|---|---|
| CONDITION | Y | N |
| FM ONLINE ? | 0 | 1 |
| CCM ONLINE ? | 0 | 1 |
| DOOR LOCKED ? | 0 | 1 |
| IDEK ENABLED ? | 0 | 1 |
| IDEK READER ? | 0 | 1 |
| CONNECTED ? | 0 | 1 |

Fig. 24

SECURITY SYSTEM

BACKGROUND OF THE INVENTION

This invention relates to an automatic security system, and more particularly to an automatic security system including a central controller that communicates with insertion-type magnetic card readers as well as proximity-type card readers.

Automatic security systems are well-known and in widespread use. Such systems typically include a central controller connected to a plurality of card readers that are located remotely from the central controller. The card readers may be connected directly to the central controller, or may be connected via multiplexers. A number of remote card readers may be located at various entrances of a building and connected to the central controller. In order to gain access to the building, a person must present an identification card to one of the remote readers, which communicates with the central controller to determine whether the person who presented the identification card is authorized to enter the building. If the person is authorized to enter, the central controller transmits a signal to the remote terminal, which electronically unlocks the door so that the person may enter. Such security systems are described in more detail in U.S. Pat. Nos. 4,095,739; 4,097,727; 4,155,073; 4,216,375; 4,218,690; 4,538,056; and 4,544,832.

The security systems described in the patents listed above utilize insertion-type card readers. This type of card reader is activated by the insertion of a plastic card having magnetically encoded data thereon. The data includes an identification code that is read by the card reader, and if the identification code is one of the codes listed in the memory of the central controller, access is granted. Insertion-type magnetic card readers, which are in widespread use, are described in more detail in U.S. Pat. Nos. 3,588,397; 3,612,788; 3,634,657; 3648,021; 3,686,479; and 3,780,268.

Similar security systems as those described above utilize proximity-type card readers instead of insertion-type readers. Proximity-type card readers do not require the insertion of a card; the card must only be brought within a predetermined distance of the proximity reader, which will then sense the presence of the card and authorize or deny access based upon data that is transmitted from the card. Such proximity-type card readers are well-known and commercially available from Identification Devices, Inc. of Boulder, Colo.

The security systems which utilize insertion-type card readers cannot be used with the proximity readers described above, and security systems used in connection with proximity readers are not able to support insertion-type card readers.

SUMMARY OF THE INVENTION

The present invention is directed towards a security system utilizing both insertion-type card readers and proximity-type card readers. The security system includes a single central controller that communicates with both types of card readers. Proximity-type readers tend to be less burdensome to the person seeking access since a card needs only to be brought to within a predetermined distance of such a reader, and does not need to be inserted. Thus, it may be advantageous to upgrade current insertion-type systems by adding additional card readers of the proximity type.

Another aspect of the invention is directed towards a security access system in which a proximity-type card reader is made to look like an insertion-type card reader to the central controller. This is accomplished by the use of a proximity protocol converter that translates the message format of the proximity-type card readers to the message format that the central controller is compatible with in systems utilizing insertion-type readers. As a result, proximity-type card readers can be added to existing insertion-type systems. Another advantage of the invention is that proximity-only card reader systems can be used with a central controller normally used in insertion-type reader systems. Thus, the design of a separate controller for proximity reader systems is unnecessary.

These and other objects, features, and advantages of this invention will be apparent in view of the following detailed description of several preferred embodiments, which are explained with reference to the figures, a brief description of which is provided below.

BRIEF DESCRIPTION OF THE DRAWINGS

FIG. 8 illustrates the message format of a proximity multiplexer in accordance with the invention and includes a function table describing message functions and the corresponding function codes;

FIG. 9 illustrates the message format for a feature module and includes a pair of function tables which include descriptions of the messages transmitted to and from the feature module and their corresponding function codes;

Figure 1:
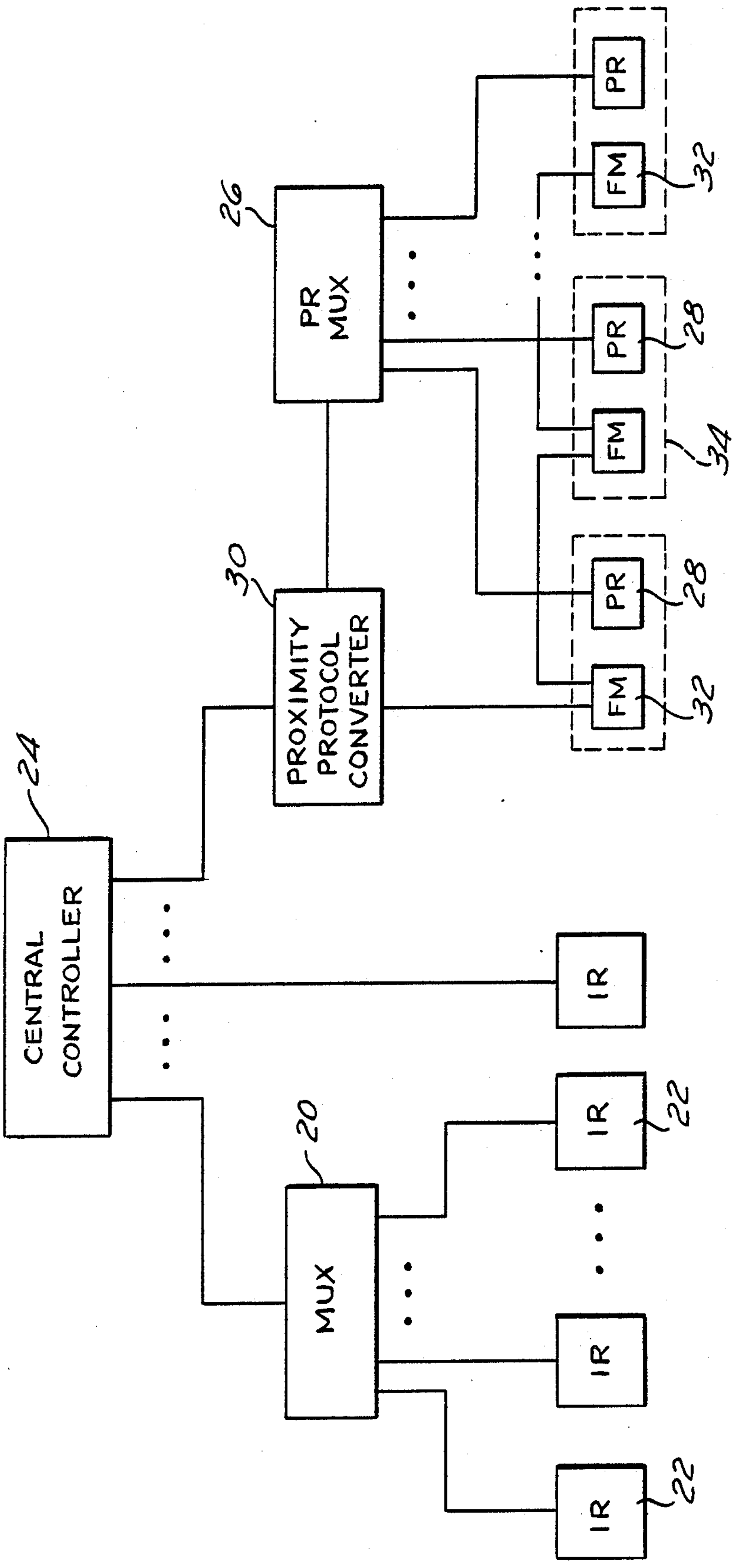
FIG. 1 is a block diagram of a first embodiment of a security system in accordance with the invention.
Figure 2:
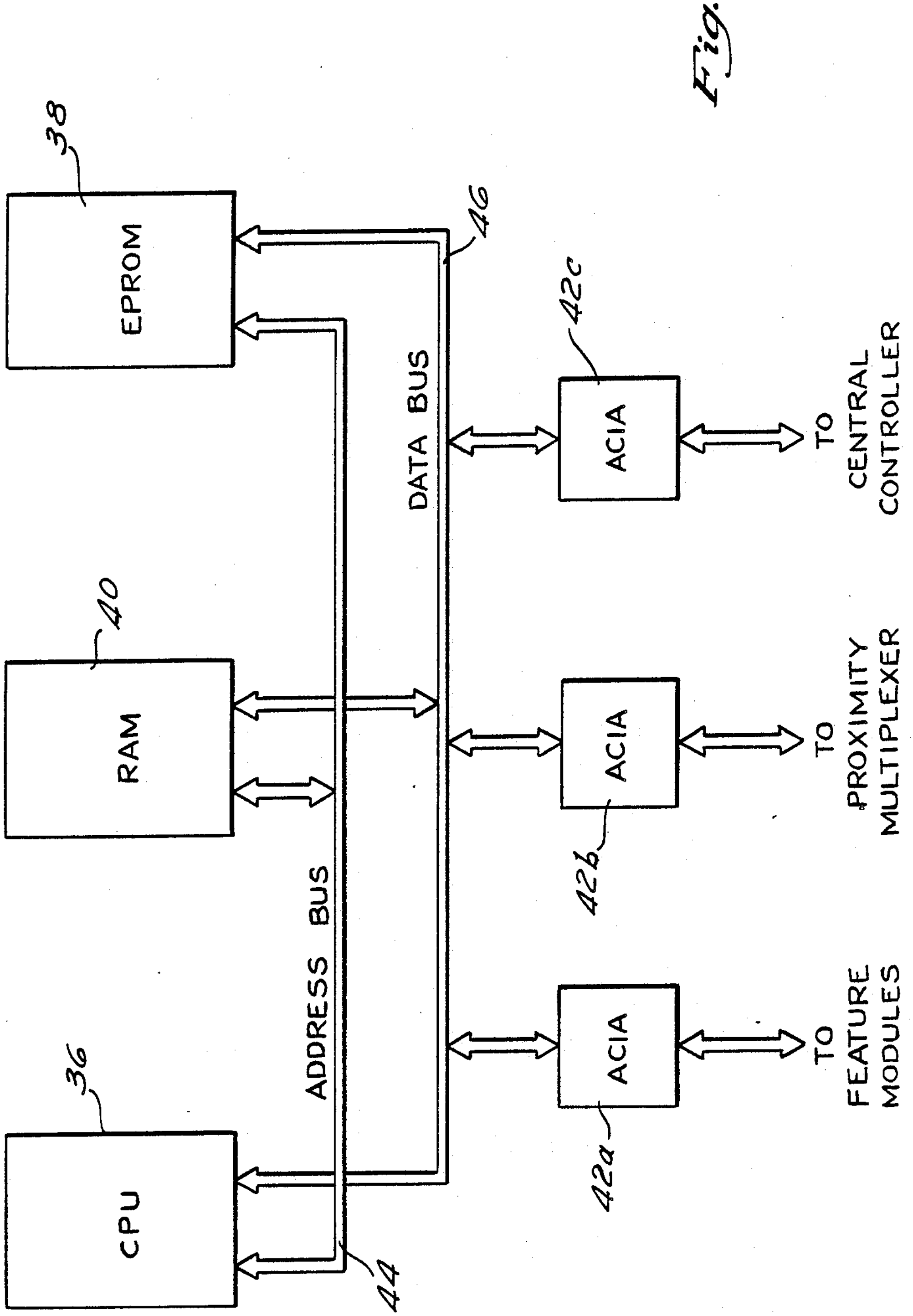
FIG. 2 is a block diagram of the proximity protocol converter of the system of FIG. 1.
Figures 11, 12:
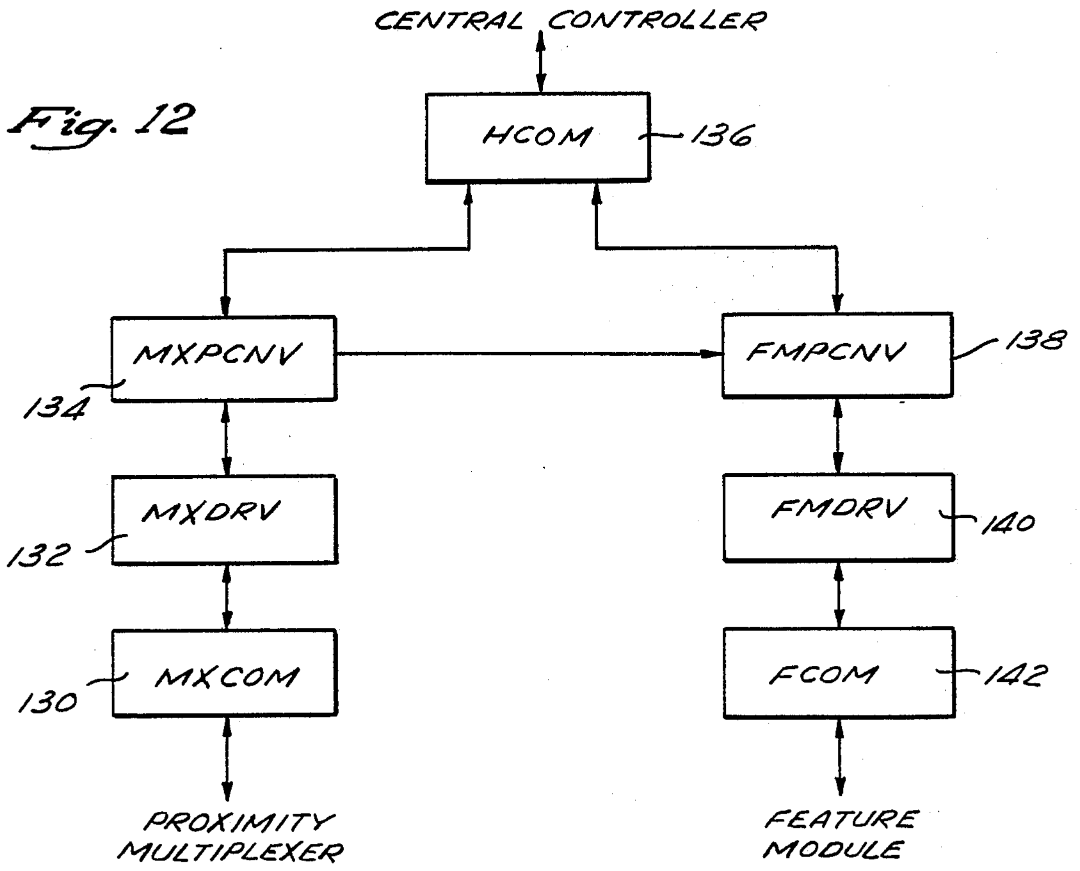
Figure 13:
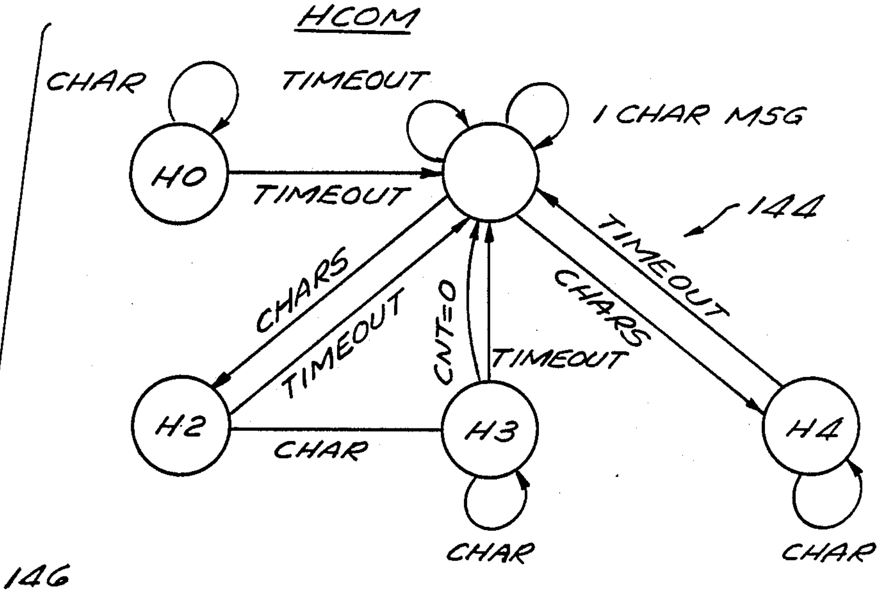
Figure 14A:
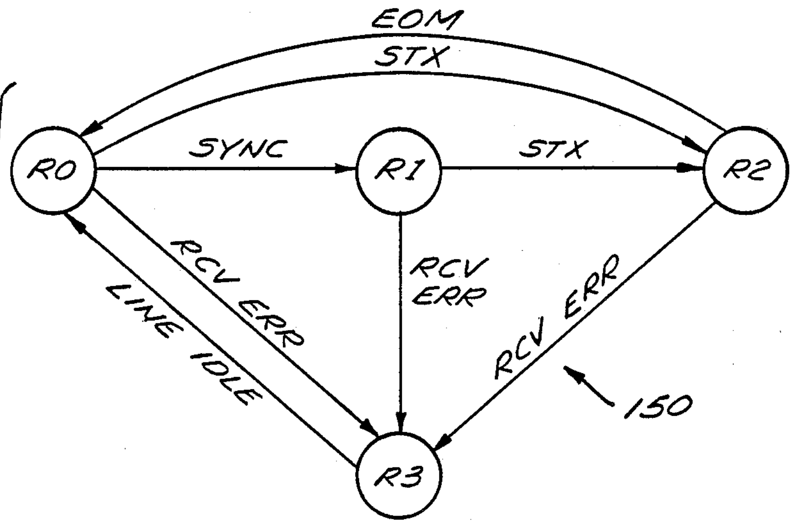
Figure 14B:
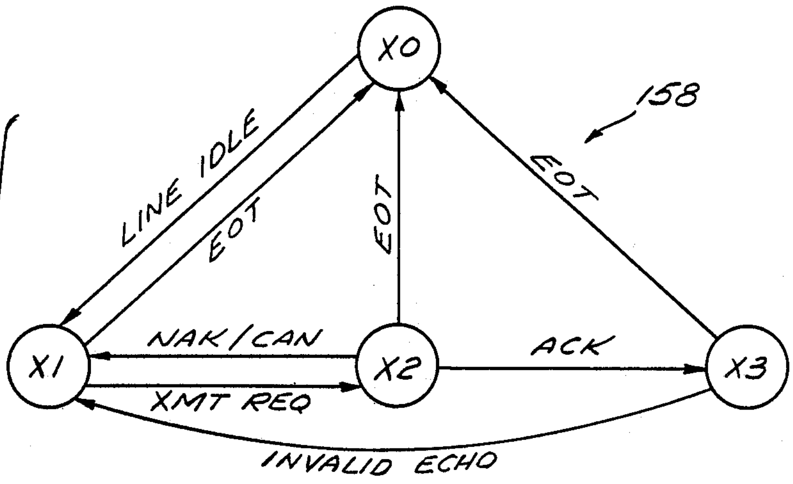
Figure 15:
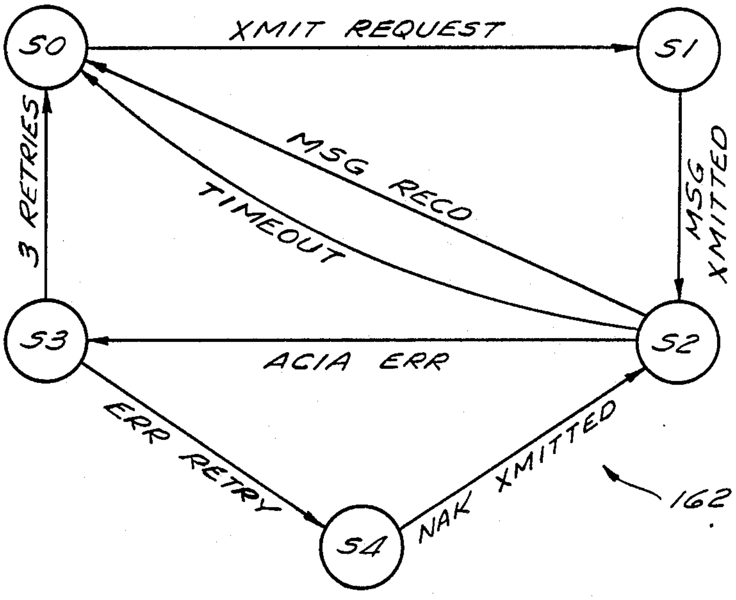
Figure 16:
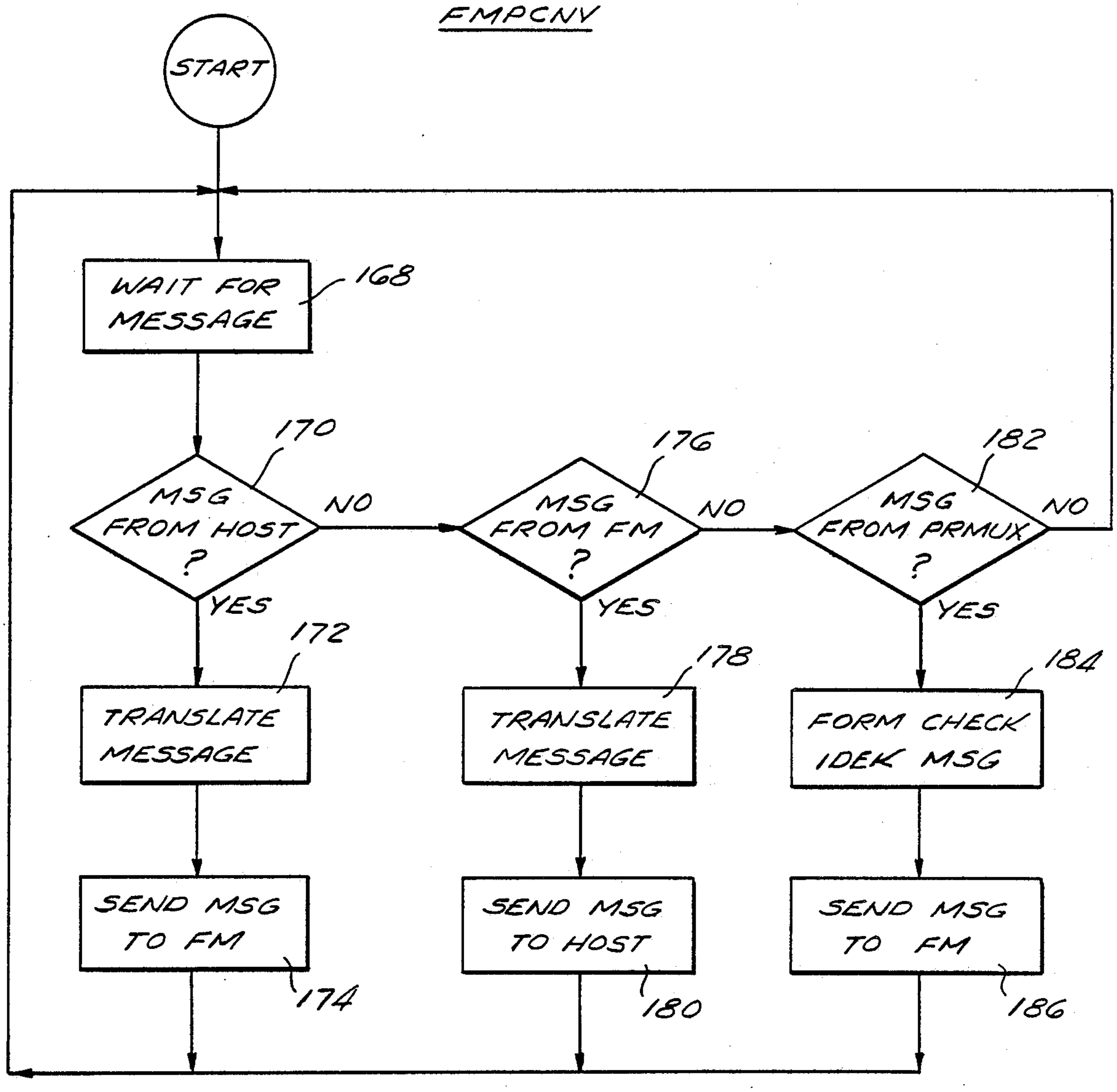
Figure 17:
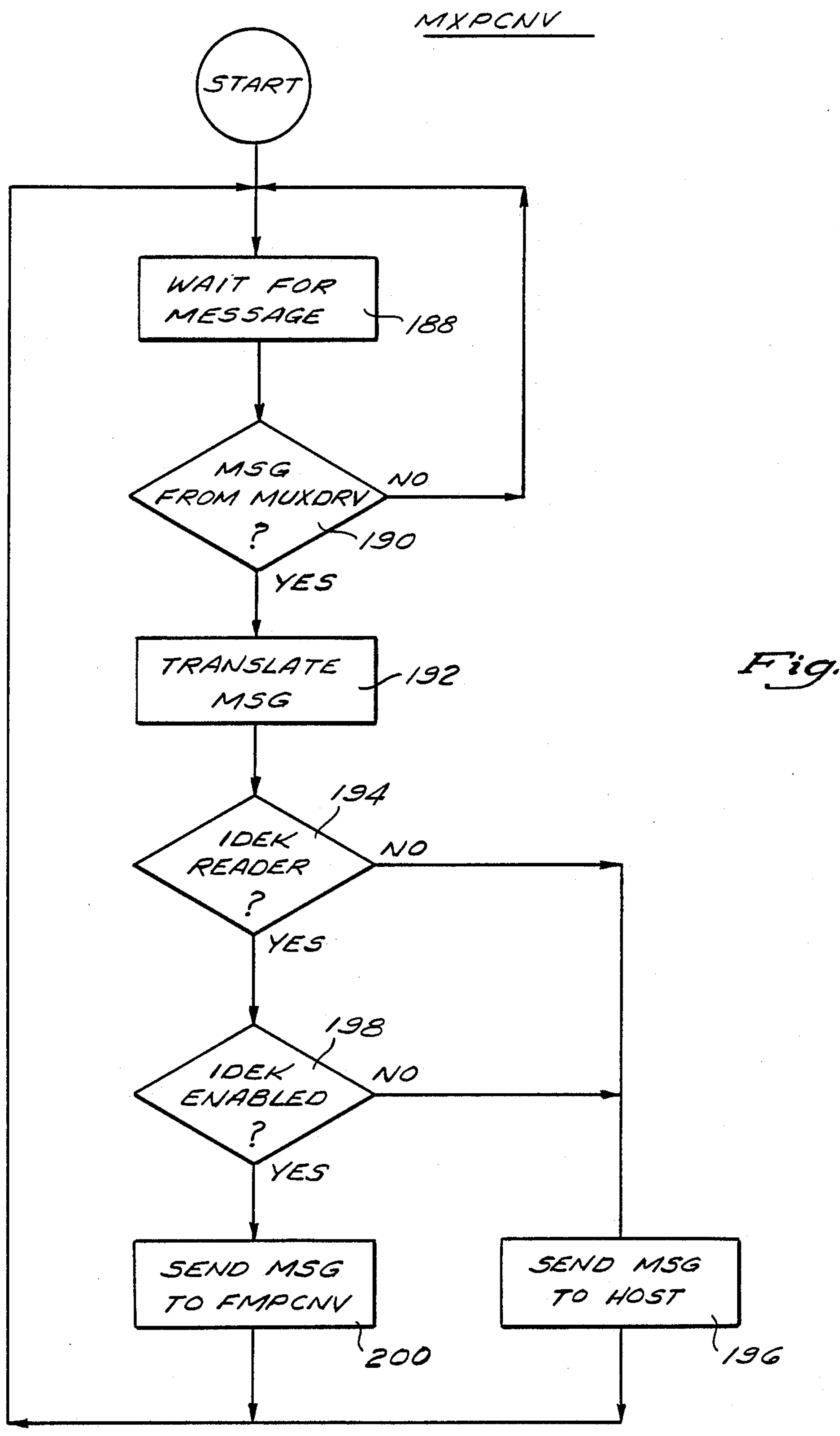
Figure 18:
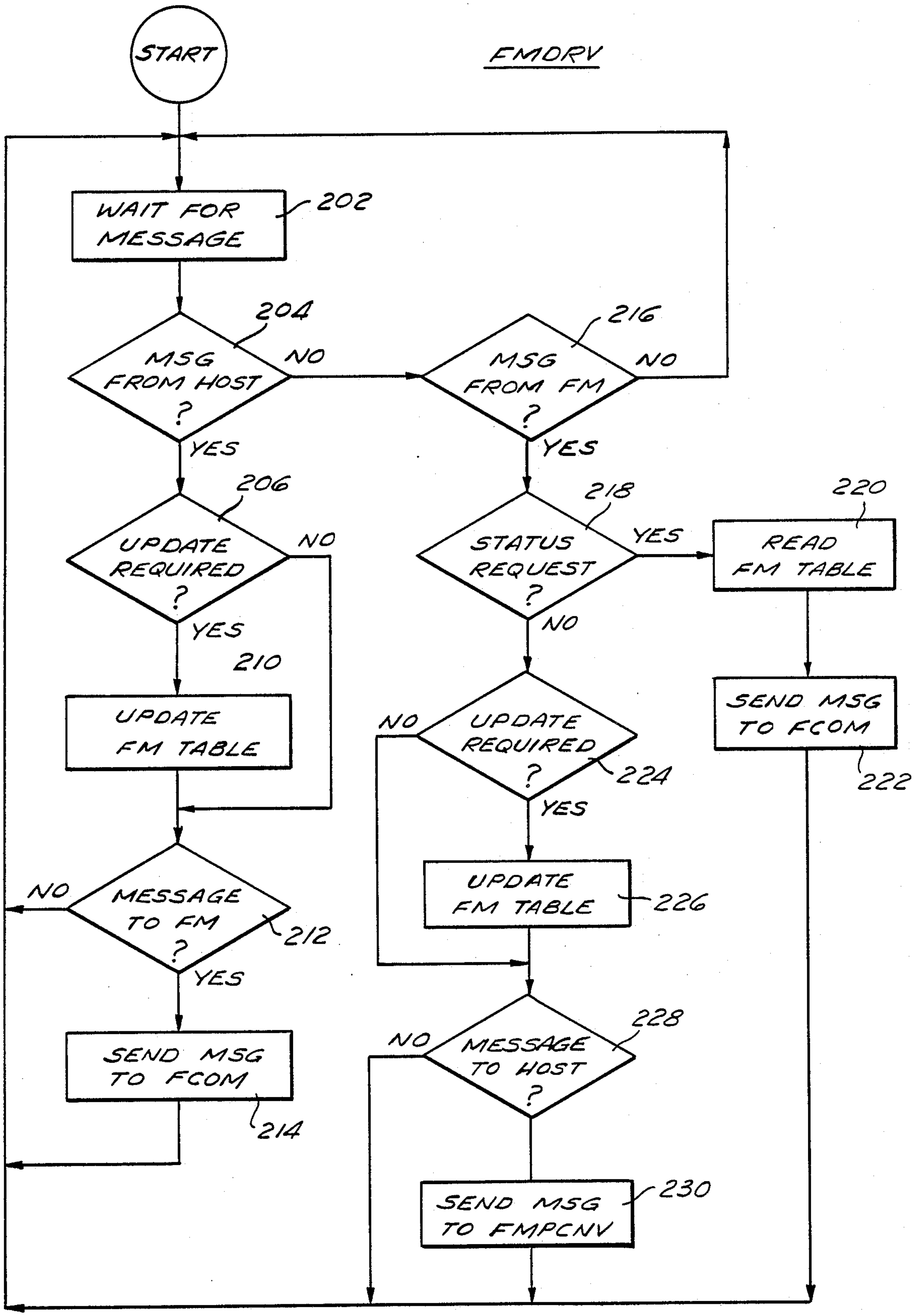
Figure 19:
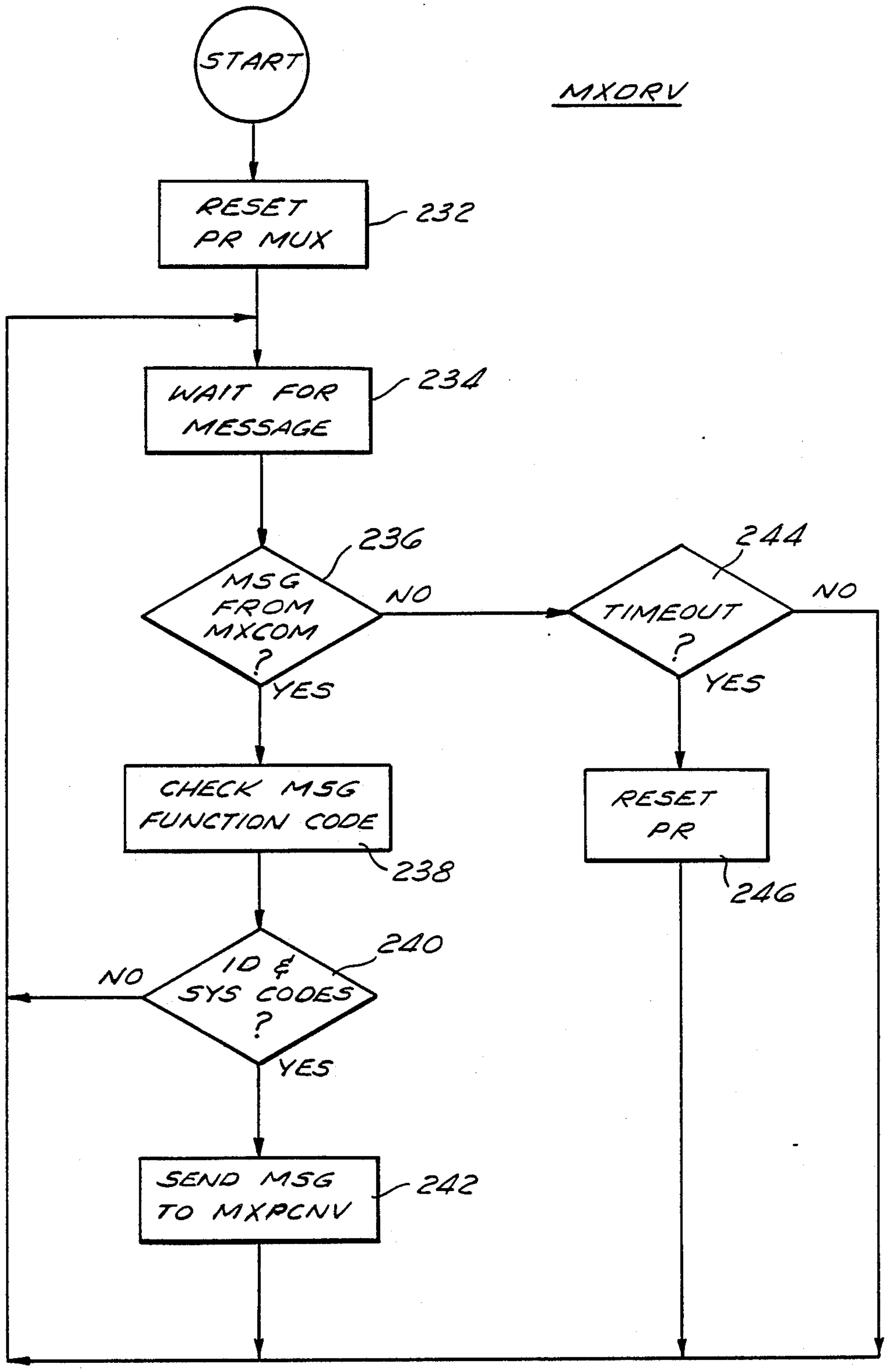
Figure 20:
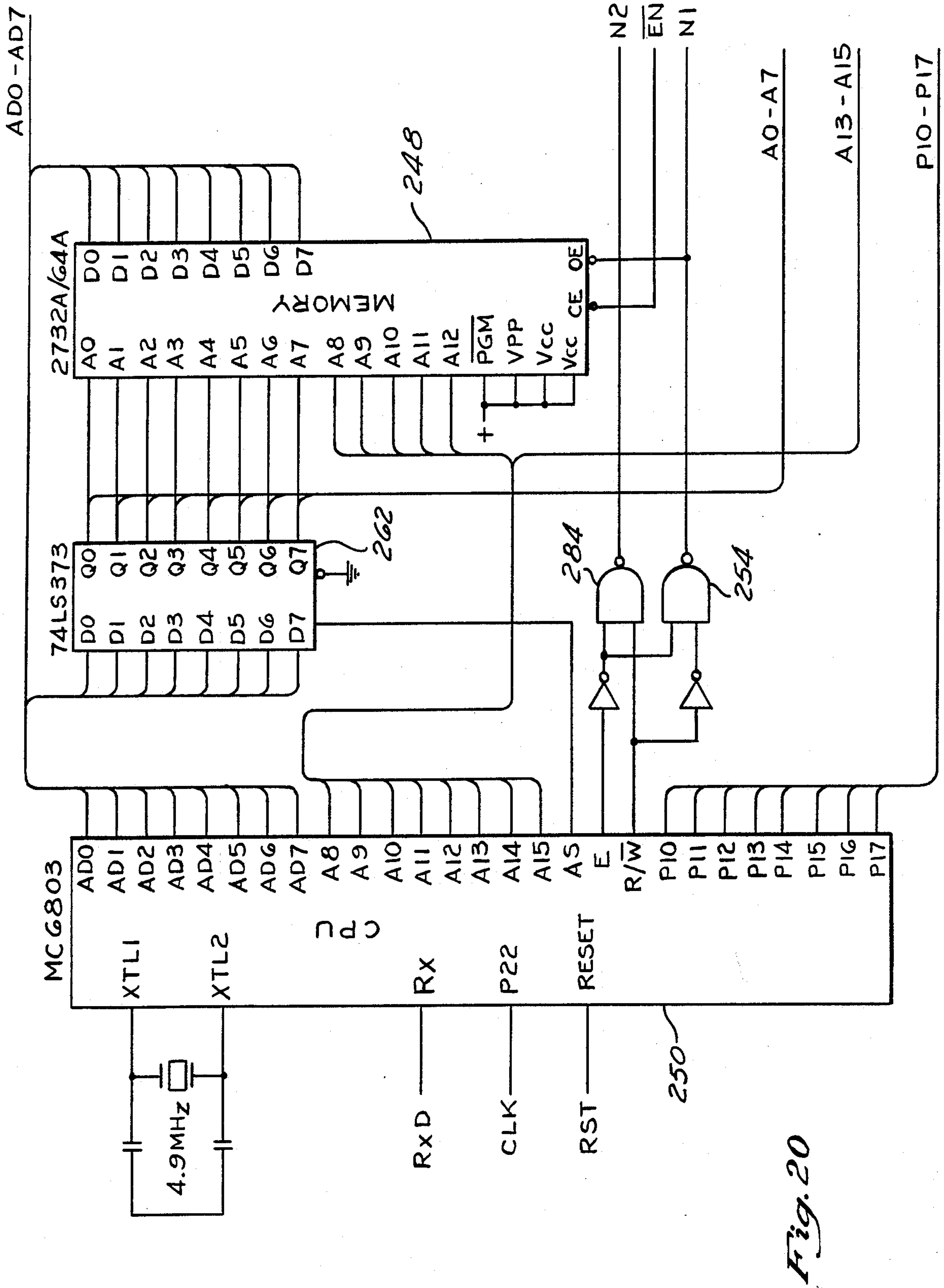
Figure 21:
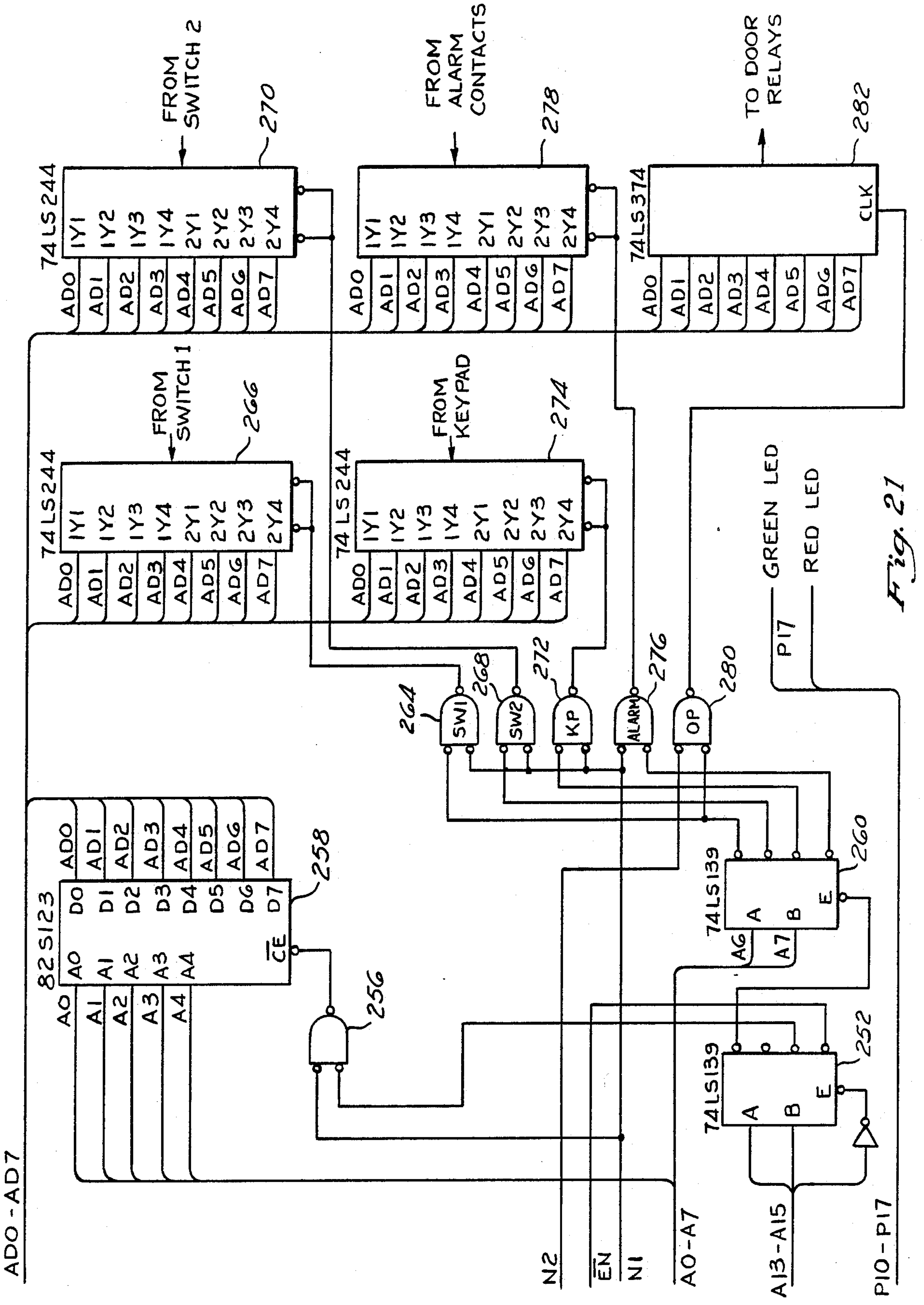
Figure 22:
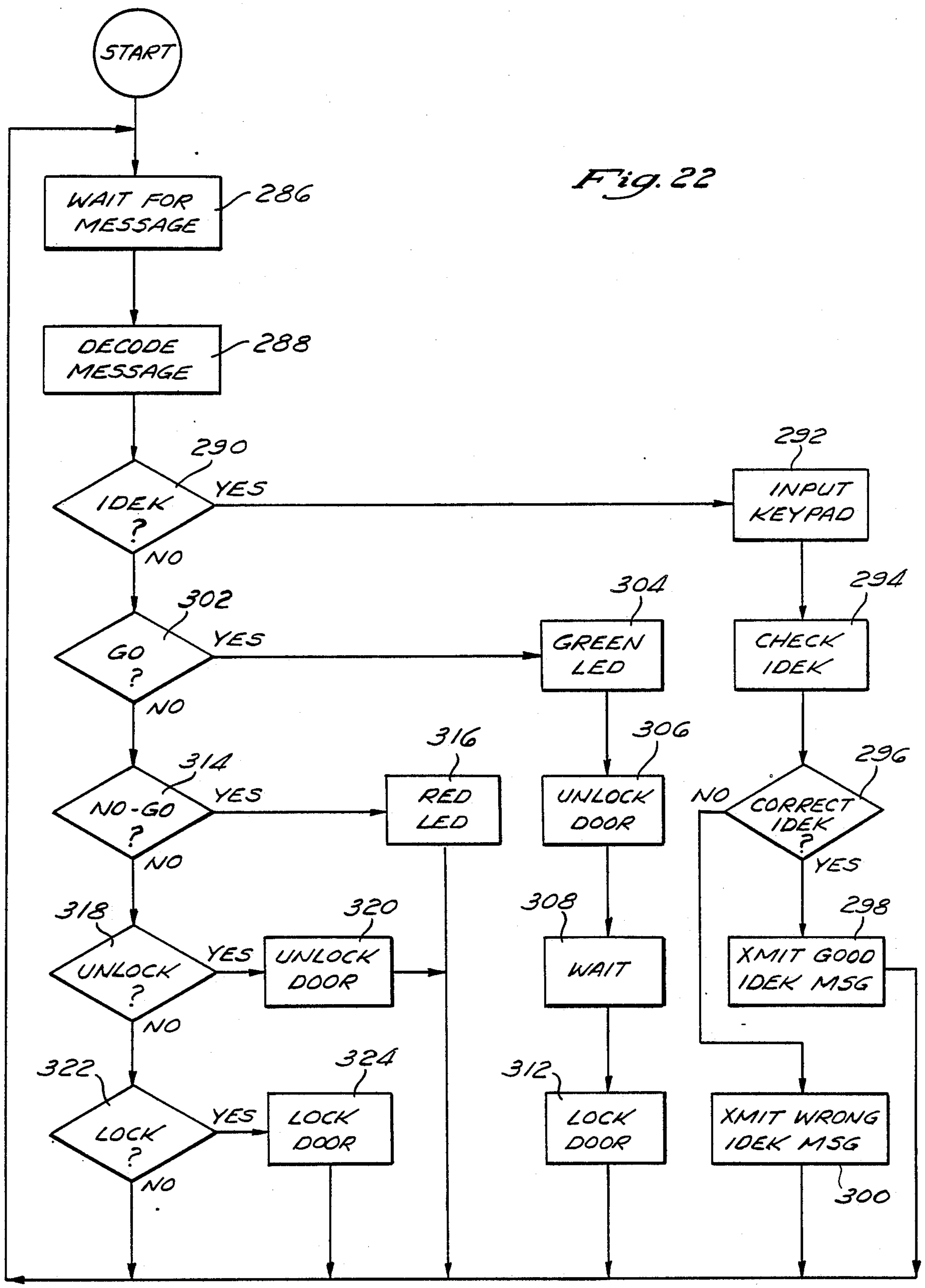
Figure 25A:
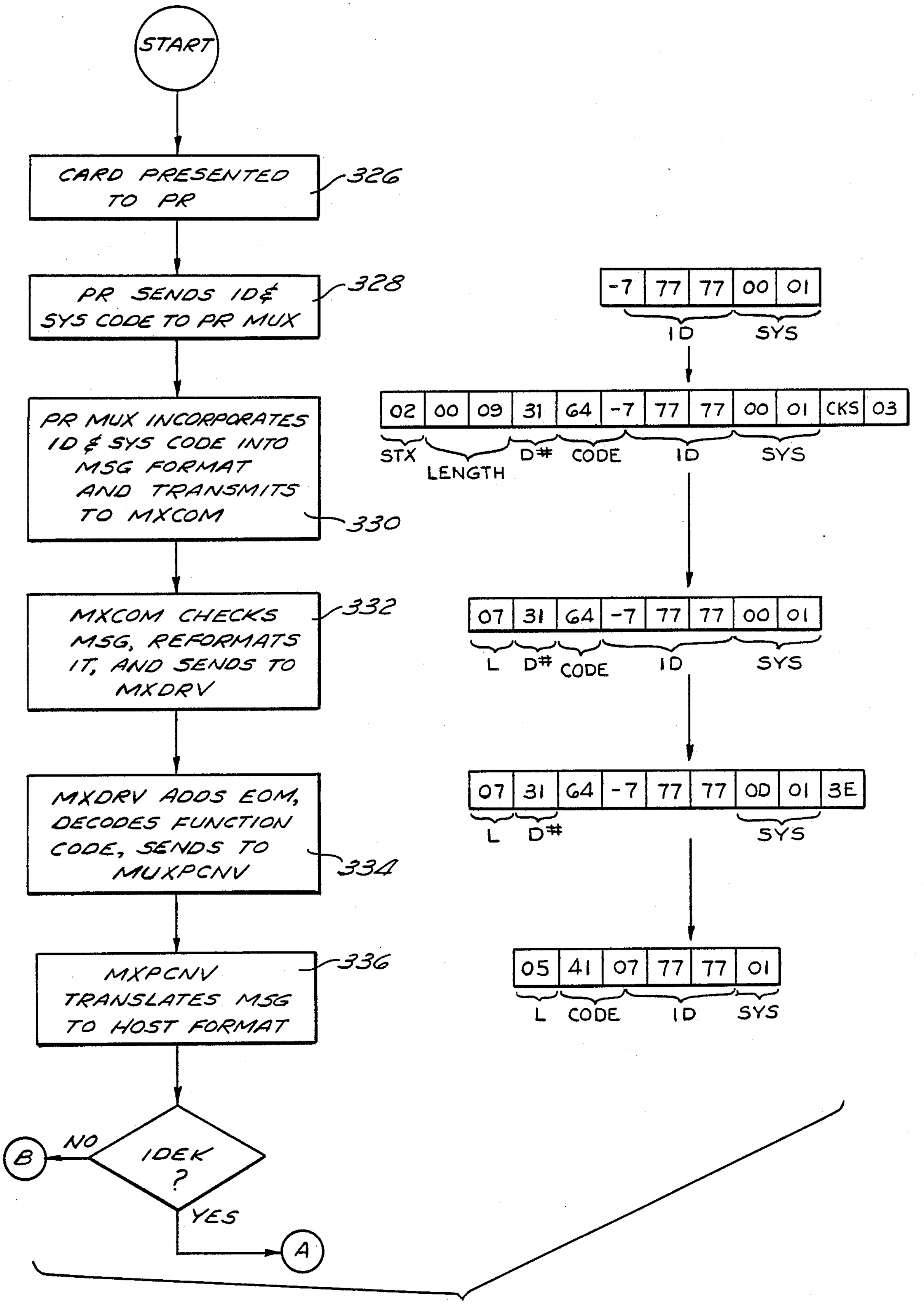
Figure 25B:
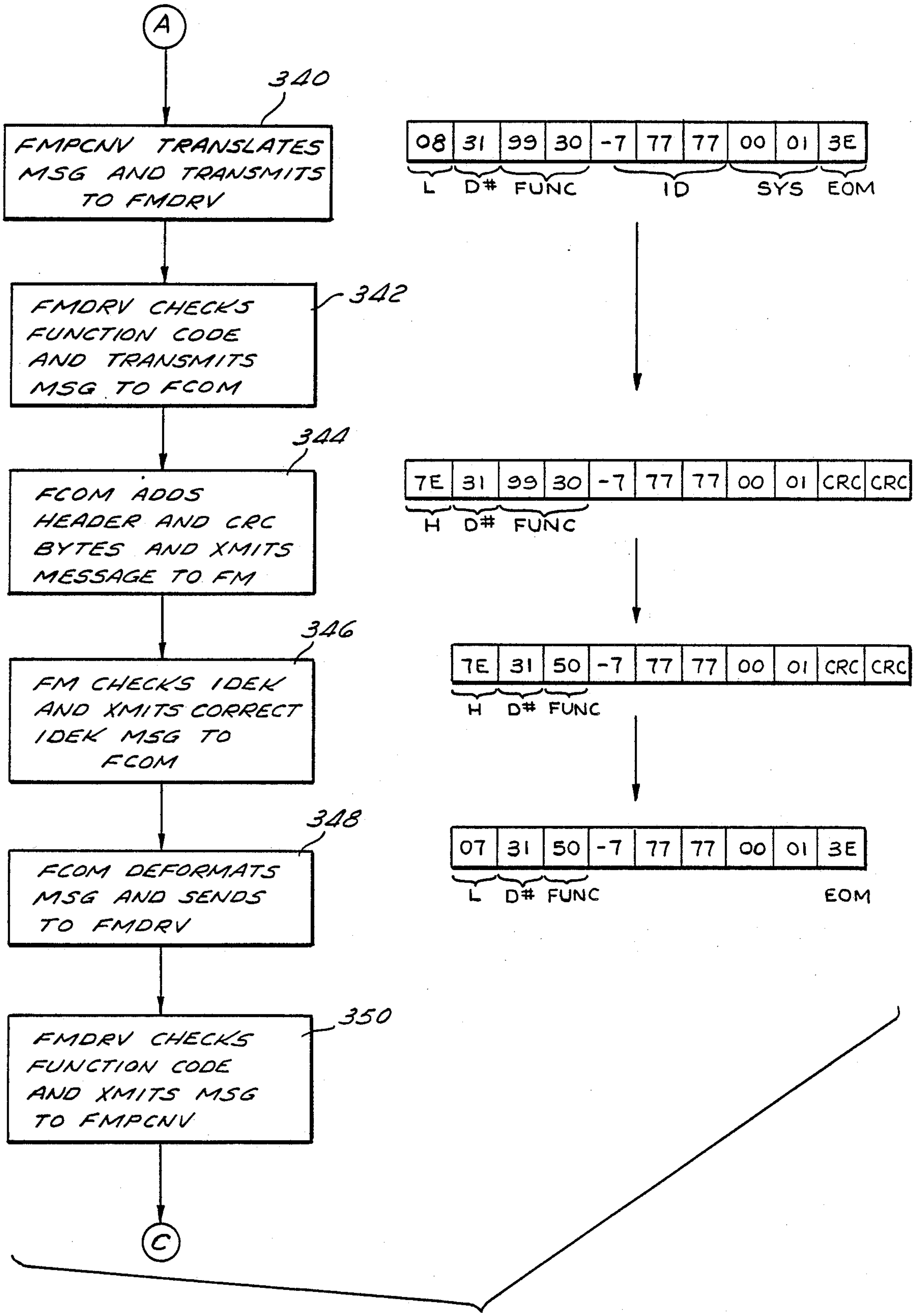
Figure 25C:
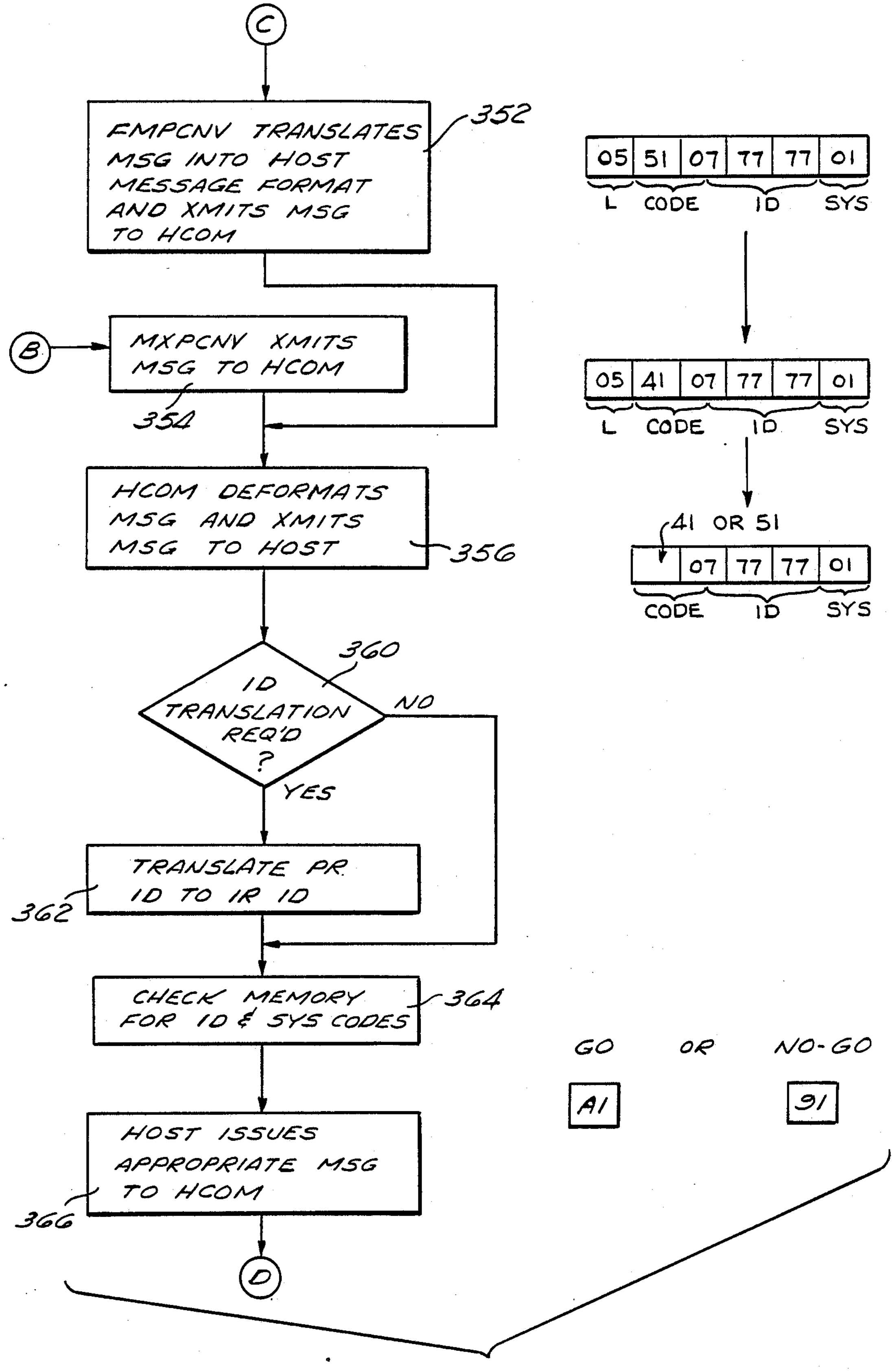
Figure 25D:
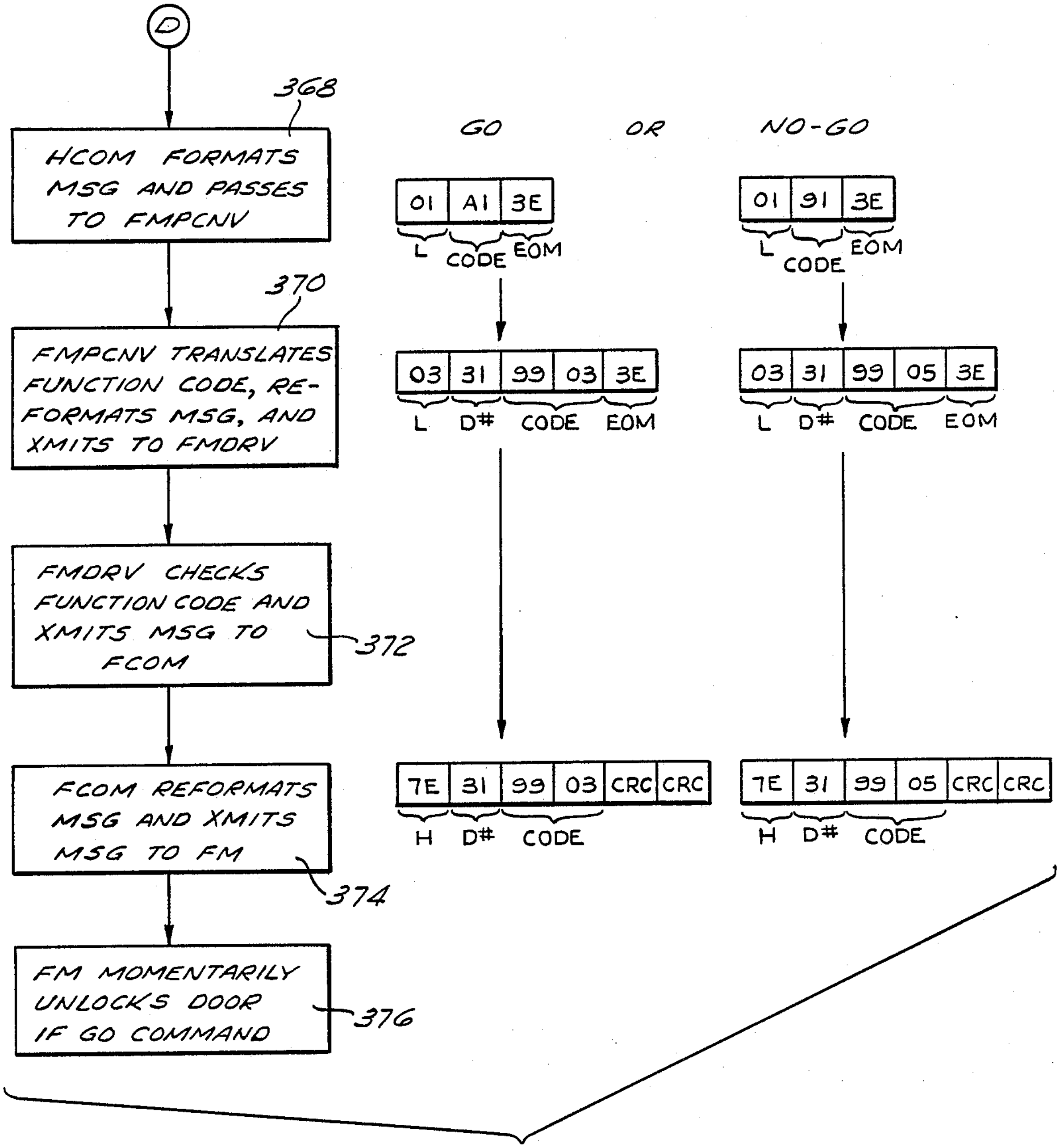
Figure 26:
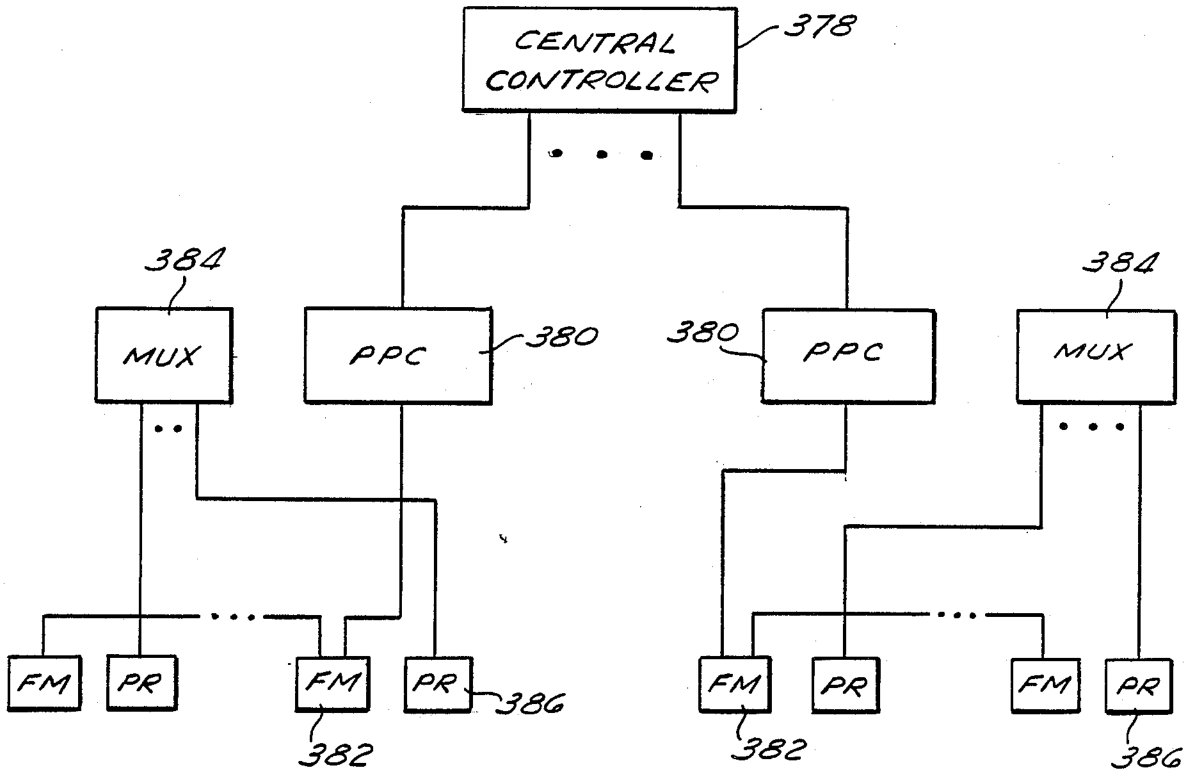

FIG. *10a* illustrates the format of messages transmitted by the central controller and includes a function table describing central controller messages and the corresponding function codes;

FIG. *10b* illustrates the format of messages received by the central controller and includes a function table describing these messages and the corresponding function codes;

FIG. 11 illustrates three function code translation tables derived from the tables shown in FIG. 8–10;

FIG. 12 is an overall block diagram of the computer program incorporated in the proximity protocol converter of FIG. 2;

FIG. 13 shows a state diagram and corresponding state tables of the host communication protocol of FIG. 12;

FIG. 14*a* shows a state diagram and corresponding state tables of the receive portion of the multiplexer communication protocol of FIG. 12;

FIG. 14*b* shows a state diagram and corresponding state tables of the transmit portion of the multiplexer communication protocol of FIG. 12;

FIG. 15 shows a state diagram and corresponding state tables of the feature module communication protocol of FIG. 12;

FIG. 16 is a flowchart of the feature module protocol converter of FIG. 12;

FIG. 17 is a flowchart of the proximity multiplexer protocol converter of FIG. 12;

FIG. 18 is a flowchart of the feature module driver of FIG. 12;

FIG. 19 is flowchart of the proximity multiplexer driver of FIG. 12;

FIG. 20 is a detailed circuit diagram of a first portion of a feature module of FIG. 1;

FIG. 21 is a detailed circuit diagram of a second portion of a feature module of FIG. 1;

FIG. 22 is a flowchart of the computer program executed by a feature module of FIG. 1;

FIG. 23 illustrates an ID translation table stored in the memory of the central controller of FIG. 1;

FIG. 24 illustrates a feature module table stored in the memory of a feature module of FIG. 1;

FIG. 25*a* is a flowchart of a first portion of the overall operation of the security system of FIG. 1;

FIG. 25*b* is a flowchart of a second portion of the overall operation of the security system of FIG. 1;

FIG. 25*c* is a flowchart of a third portion of the overall operation of the security system of FIG. 1;

FIG. 25*d* is a flowchart of a fourth portion of the overall operation of the security system of FIG. 1; and FIG. 26 is a block diagram of a second embodiment of a security system in accordance with the invention.

DETAILED DESCRIPTION OF THE PREFERRED EMBODIMENTS

A block diagram of a security system in which both insertion-type card readers and proximity-type card readers are incorporated is shown in FIG. 1. The insertion reader subsystem of the security system shown on the left-hand side of FIG. 1 is conventional and is widely used. This subsystem includes a multiplexer 20 coupled to a plurality of insertion readers 22, and may also include insertion readers 22 that are not connected to the multiplexer 20. The multiplexer 20, which is shown connected to three insertion readers 22, may be connected to sixteen such devices 22. The multiplexer 20 acts to transfer messages between each of the insertion readers 22 and a central controller 24 to which it is connected.

A proximity reader subsystem is shown in the right-hand portion of FIG. 1 and includes a multiplexer 26 that is shown connected to three proximity readers 28. The multiplexer 26 may be connected to up to eight proximity readers 28 and passes data presented to the proximity readers 28 to a proximity protocol converter 30. The proximity protocol converter 30 is connected to a plurality of daisy-chained feature modules 32, one for each of the proximity readers 28. As indicated by the dashed lines 34, the combination of a feature module 32 and a proximity reader 28 accomplishes the same basic functions as an insertion reader 22.

The central controller 24 controls the operation of the insertion readers 22 through the multiplexer 20 and the operation of the proximity readers 28 through the proximity protocol converter 30. The central controller 24 may also be connected directly to a single insertion reader 22 as shown; however, the multiplexer 20 allows for greater system expansion since it can handle up to sixteen insertion readers 22.

During the operation of the insertion subsystem, a person seeking access presents a card to one of the insertion readers 22, which passes the card identification code and system code data it read from the card to the central controller 24 via the multiplexer 20. The controller 24 then checks its memory to determine if the identification and system code data corresponds to an authorized person. If the person is authorized, the same identification and system codes will reside in the central controller memory. The central controller 24 then transmits either a GO command or a NO-GO command. As is explained in more detail below, a GO command causes the insertion reader 22 to unlock the door to which access was requested, and a NO-GO command does not cause the door to be unlocked. The appropriate command is transmitted to the insertion reader 22 via the multiplexer 20. Other messages are transmitted between the insertion readers 22 and the central controller 24 as is described in more detail below.

In the operation of the proximity subsystem, a person seeking access presents his or her card within a predetermined distance of a proximity reader 28. The proximity reader 28 then transmits the identification and system code data it received from the card to the proximity multiplexer 26, which transmits the data to the proximity protocol converter 30. The proximity protocol converter 30 then transmits this data to the central controller 24 so that the controller 24 can check its memory to determine if the identification and system code data corresponds to an authorized person. The central controller 24 then transmits either a GO command or a NO-GO command to the appropriate feature module 32 via the proximity protocol converter 30. The feature module 32, which includes relays that selectively lock and unlock the door, unlocks the door upon receipt of the GO command.

The proximity protocol converter 30 communicates data and messages between the feature modules 32 and the multiplexer 26 and presents the data to the central controller 24 in the same format as the multiplexer 20 which services the insertion readers 22. Thus, the central controller 24 is able to communicate with the proximity reader subsystem as though it were an insertion reader subsystem.

A block diagram of a proximity protocol converter 30 is shown in FIG. 2. The proximity protocol converter 30 includes a central processing unit (CPU) 36 which executes a computer program stored in an erasable-programmable read-only memory (EPROM) 38. The proximity protocol converter 30 also includes random-access memory (RAM) 40 and three asynchronous communication interface adapter (ACIA) units 42. One of the ACIAs communicates with a feature module 32; another of the ACIA communicates with the proximity multiplexer 26; and the third ACIA communicates with the central controller 24. The CPU, the RAM and the EPROM communicate via an address bus 44 and a data bus 46, and the ACIAs 42 are connected to the data bus 46. During operation, the proximity protocol converter 30 sends and receives messages to the feature modules 32, proximity multiplexer 26, and central controller 24 via the ACIAs 42 using communication protocols which are compatible with each of the devices.

Figure 3:
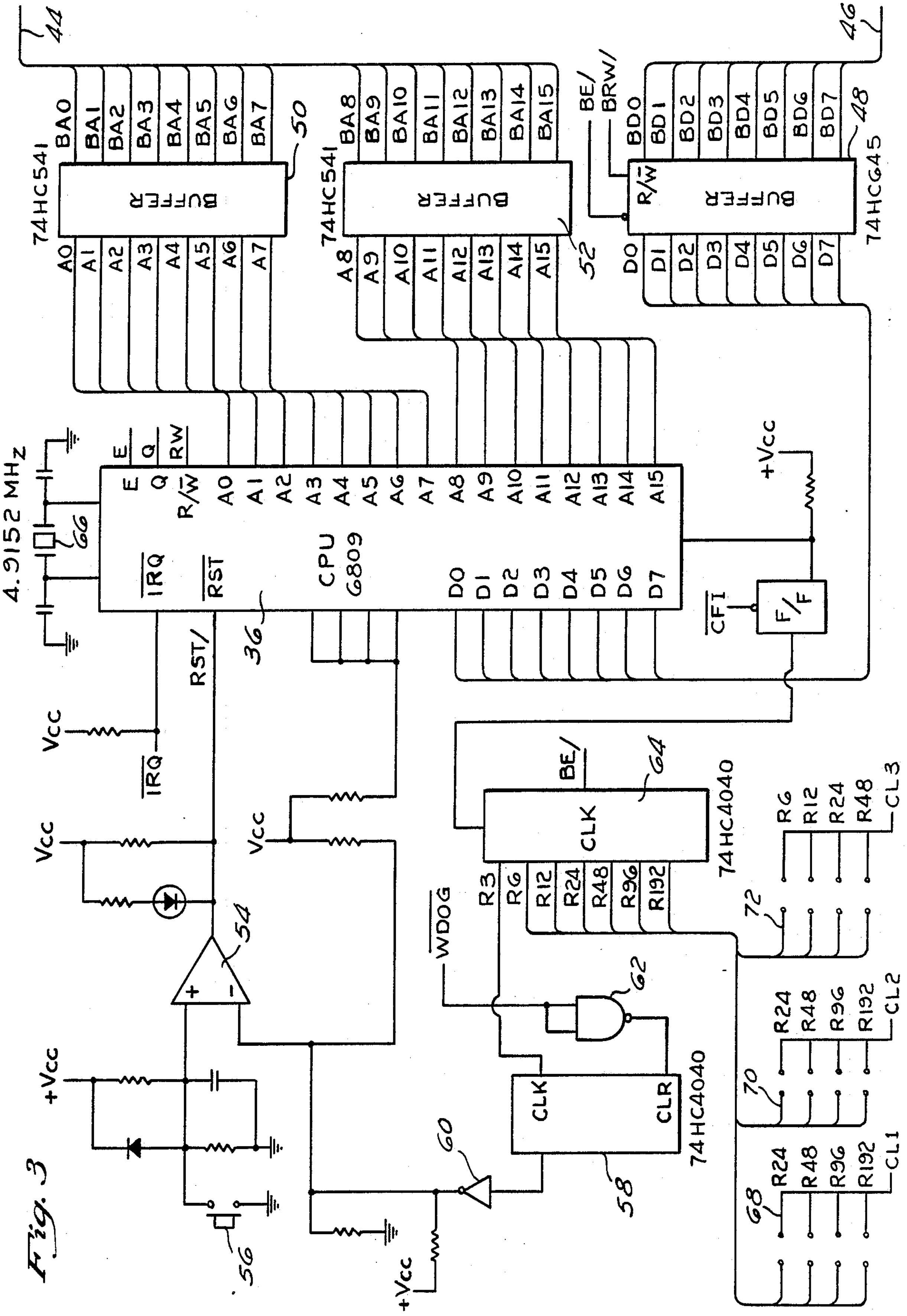
FIG. 3 is a detailed circuit diagram of the central processing unit of FIG. 2.

A detailed circuit diagram of the CPU 36 is shown in FIG. 3. The CPU 36, which is a conventional 6809 microprocessor available from Motorola, receives eight buffered data inputs D0–D7 from a buffer 48 and sixteen buffered address inputs A0–A15 from a pair of buffers 50, 52. The buffer 48 is connected to the data bus 46 which is also connected to the EPROM 38 and the ACIAs 42, and the two buffers 50, 52 are connected to the address bus 44 which is also connected to the RAM 40 and the EPROM 38.

Throughout this specification, a hyphen (-) or a diagonal (/) following a signal name is equivalent to a signal name with an overstrike, and indicates that the signal is active when logic 0. For example, RST- has the same meaning as $\overline{RST}$. Also, "logic 0" means that a signal has a low or zero voltage, and "logic 1" means that a signal has a high voltage.

The CPU 36 has a reset (RST-) input which is connected to receive a RST/ signal from an amplifier 54. The amplifier 54 has a noninverting input which is connected to a pushbutton 56, which when pushed, causes the CPU 36 to be reset. The inverting input of the amplifier 54 is connected to the most significant bit input of a binary counter 58 through an inverter 60. During normal operation, the counter 58 counts up and is periodically cleared by a watchdog timer (WDOG-) signal through a NAND gate 62. The WDOG- signal is a periodic signal that is generated, for example, every 50 milliseconds. The activation of the WDOG-signal causes the binary counter 58 to be cleared so that the most significant bit to which the inverter 60 is connected never becomes logic 1. If the WDOG- signal is not generated, which signals a malfunction, the counter 58 will not be cleared and will be keep counting up until the most significant bit becomes logic 1, thus causing the inverting input of the amplifier 54 to be pulled low. As a result, the CPU 36 is reset.

The clock input of the counter 58 is supplied by the most significant bit of a second counter 64 which is driven by a clock signal (BE/) which is generated from a clock (E) signal generated by the CPU 36. The E signal is generated by the CPU 36 from the 4.9152 megahertz clock signal generated by a crystal 66 attached to the CPU 36.

The six most significant bits of the second binary counter 64 are supplied to three sets of jumpers 68, 70, 72. Each of the jumpers 68, 70, 72 generates a respective clock signal, CL1, CL2, or CL3, each of which is supplied to a respective one of the ACIA units 42. By selectively connecting the jumpers 68, 70, 72, different frequency clock signals CL1, CL2, and CL3 can be provided.

Figure 4:
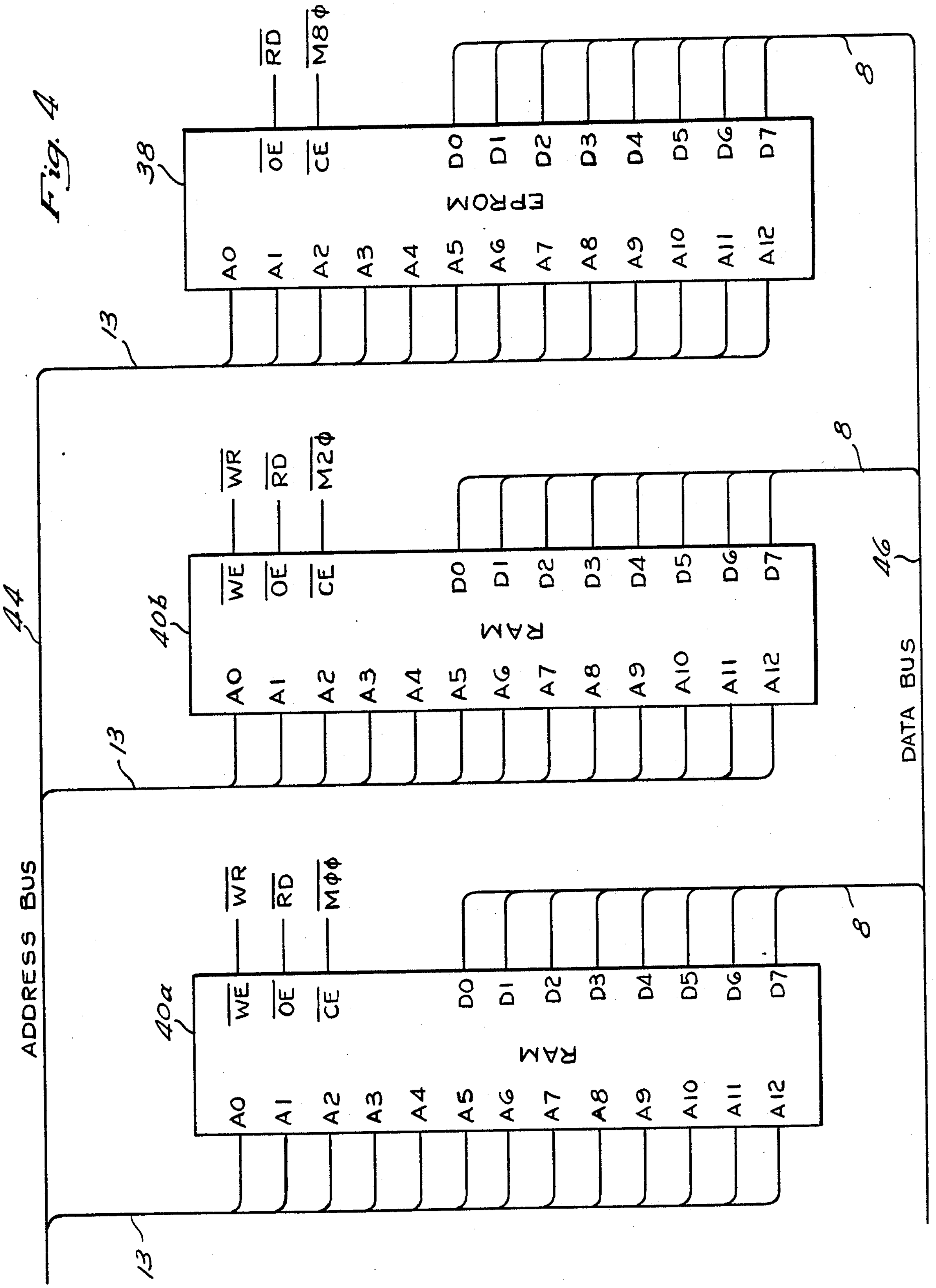
FIG. 4 is a detailed circuit diagram of the random access memory and the erasable-programmable-read-only memory of FIG. 2.

The detailed circuit diagram of the RAM 40 and the EPROM 38 are shown in FIG. 4. The two RAMs 40*a*, 40*b* and the EPROM 38 each have eight data inputs D0–D7 which are connected to the data bus 46, and thirteen address inputs A0–A12 which are connected to the address bus 44. The two RAMs 40*a*, 40*b* each have two additional inputs which include a write enable (WE-) input and an output enable (OE-) input which are enabled by a write signal (WR-) and a read (RD-) signal, respectively. The OE-input of the EPROM 38 is activated by the RD- signal.

The CPU 36 selects one of the two RAMs 40*a*, 40*b* or the EPROM 38 by providing an appropriate chip enable signal to their chip enable inputs. In particular, the RAM 40*a* is enabled by a logic 0 M00- signal, the RAM 40*b* is enabled by a logic 0 M20- signal, and the EPROM 38 is activated by a logic 0 M80- signal, only one of the M00-, M20-, and M80- signals being activated at a time.

Figure 5:
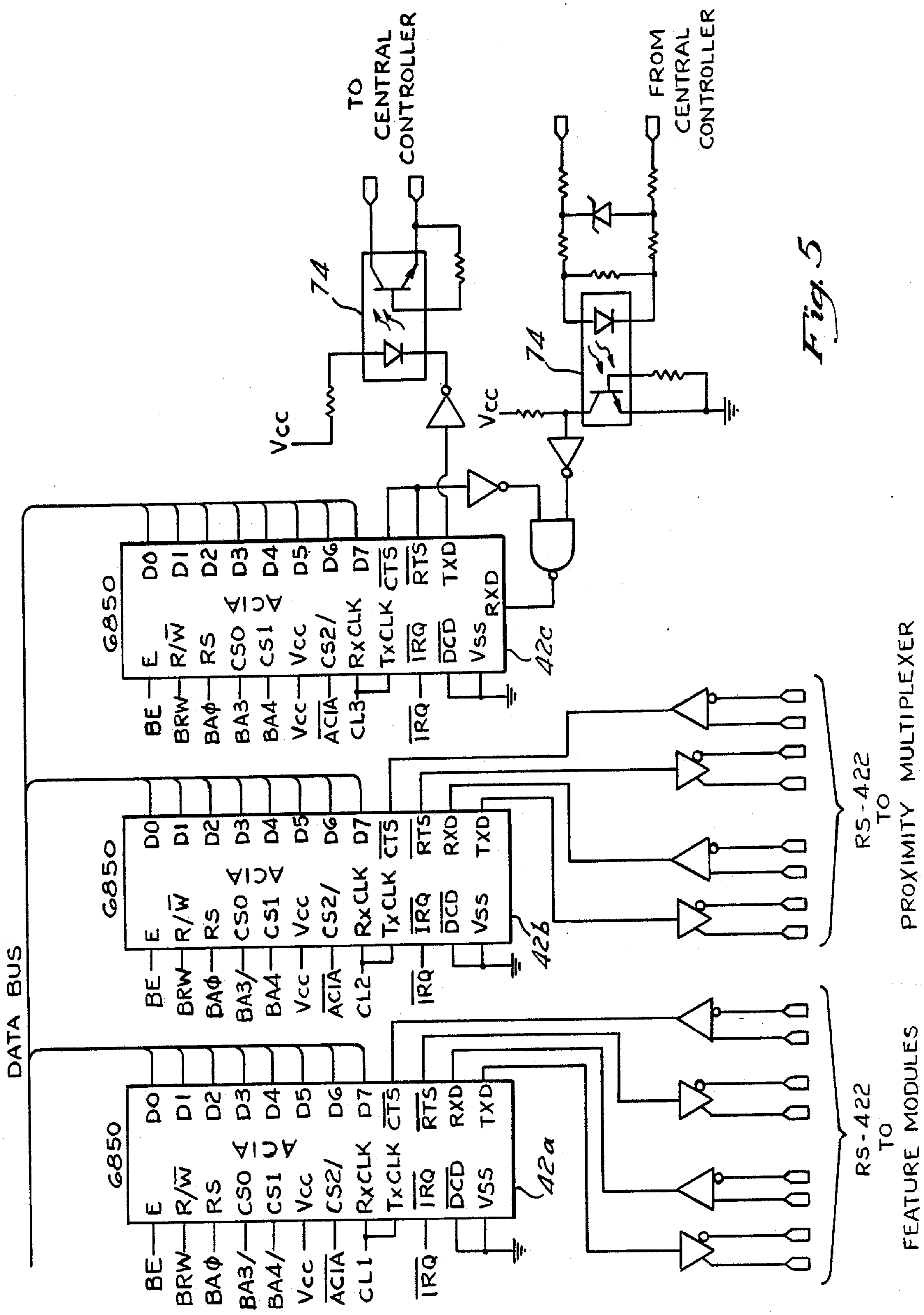
FIG. 5 is a detailed circuit diagram of three asynchronous communications interface adapters of FIG. 2.

The detailed circuit diagram of the three ACIA units 42 is shown in FIG. 5. A first ACIA unit 42*a* is dedicated to communications with the feature modules 32 via a standard RS-422 interface, a second of the ACIA units 42*b* communicates with the proximity multiplexer 26 also by an RS-422 interface, and the third ACIA unit 42*c* communicates with the central controller 24 via an input and an output each of which is optically decoupled by a decoupler circuit 74 to prevent interference between the central controller 24 and the ACIA units 42.

The eight data inputs D0–D7 of the ACIA units 42 are connected to the data bus 46, and they receive and transmit data to and from the bus 46 as determined by a buffered read-write (BRW) signal. Each of the ACIA units 42 also receives a buffered enable (BE) signal at its E clock input and also receives a respective one of the clock signals CL1, CL2, and CL3 at its receive clock (RxCLK) and transmit clock (TxCLK) inputs. The ACIA units 42 are enabled with an ACIA enable (ACIA-) signal supplied to one of their chip select inputs CS2. The other two of their chip select inputs, CS0 and CS1, are supplied various logic states of a pair of buffered address signals, BA3 and BA4, so that only one of the ACIA units 42 is enabled for transmission or reception at a time.

Figure 6:
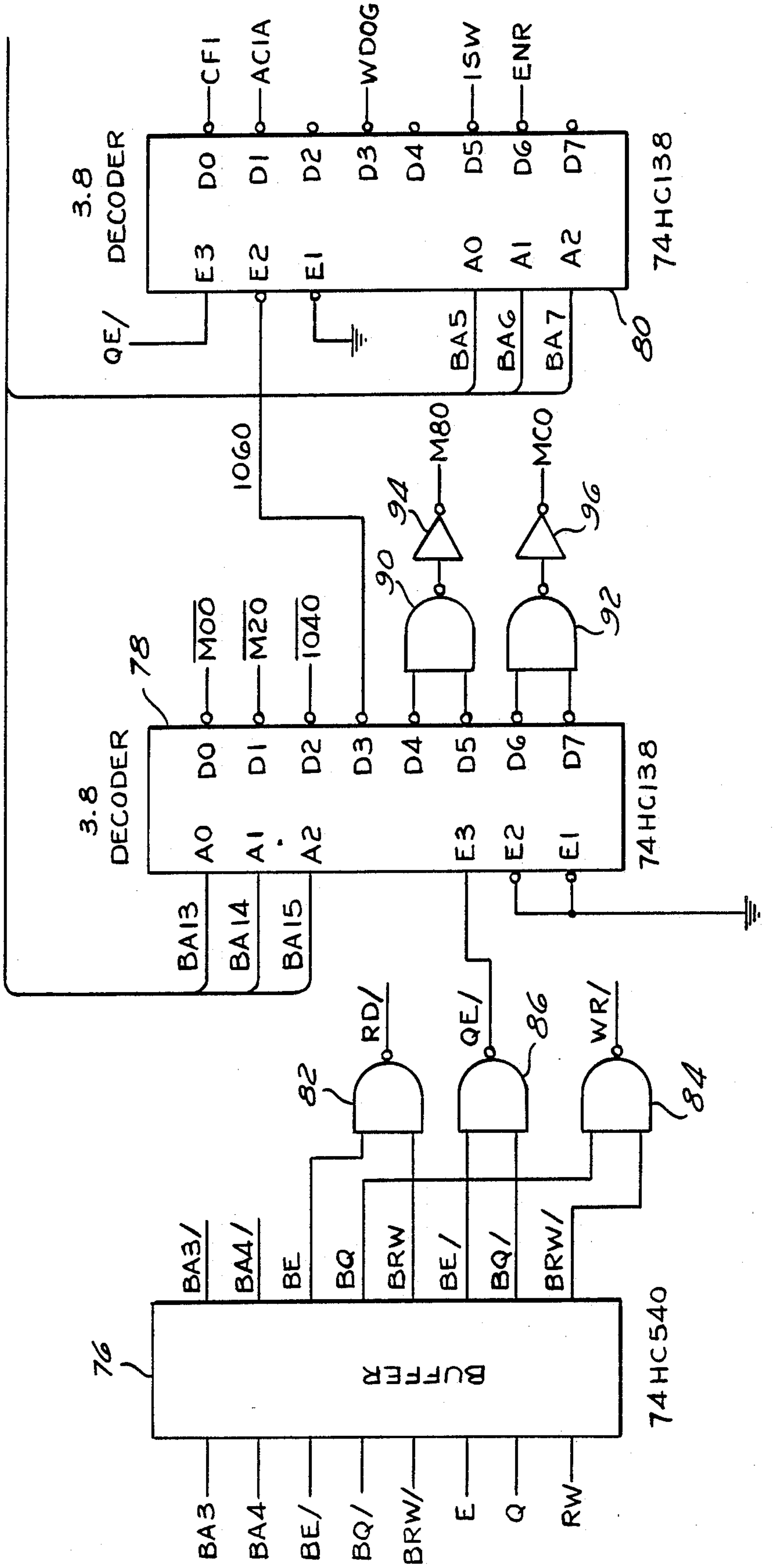
FIG. 6 is a detailed circuit diagram of a decoder portion of the circuit of the proximity protocol converter of FIG. 2.

Now referring to FIG. 6, a portion of the address decoding circuitry of the proximity protocol converter 30 is shown, and it comprises an inverting buffer 76 connected to a first three-to-eight decoder 78 and a second three-to-eight decoder 80. Each of the two decoders 78, 80 has three address inputs, A0, A1, and A2, to which three buffered address signals are input from the address bus 44, BA13–BA15 in the case of the decoder 78 and BA5-BA7 in the case of the decoder 80.

The BE and BRW signals generated by the inverting buffer 76 are input to a first NAND gate 82 and the BQ and BRW/ signals are input to a second NAND gate 84 in order to develop the RD- and WR- signals, respectively, that are supplied to the RAM 40 as described above. Another pair of inputs, BE/ and BQ/, is supplied to a third NAND gate 86 in order to develop an enable (QE/) signal which is input to the first decoder 78 at its third enable (E3) input. The other two enable inputs, E1 and E2, are tied low. Thus, whether the decoder 78 is activated depends on the value of the QE/ signal.

This decoder 78 generates eight output data signals, which include the M00- and M20- signals referred to above. The 1040- enable signal activates a third decoder 88 described below, and the 1060- enable signal activates the second decoder 80, which also produces a number of enable signals. The remaining four output signals from the first decoder 78 are supplied to a pair of NAND gates 90, 92 coupled to a pair of inverters 94, 96, respectively, and together these gates generate the M80- and MC0- enable signals. The second three-to-eight decoder 80, when enabled by the 1060- enable signal, generates the CFI-, ACIA-, WDOG-, ISW-, and ENR- signals.

Figure 7:
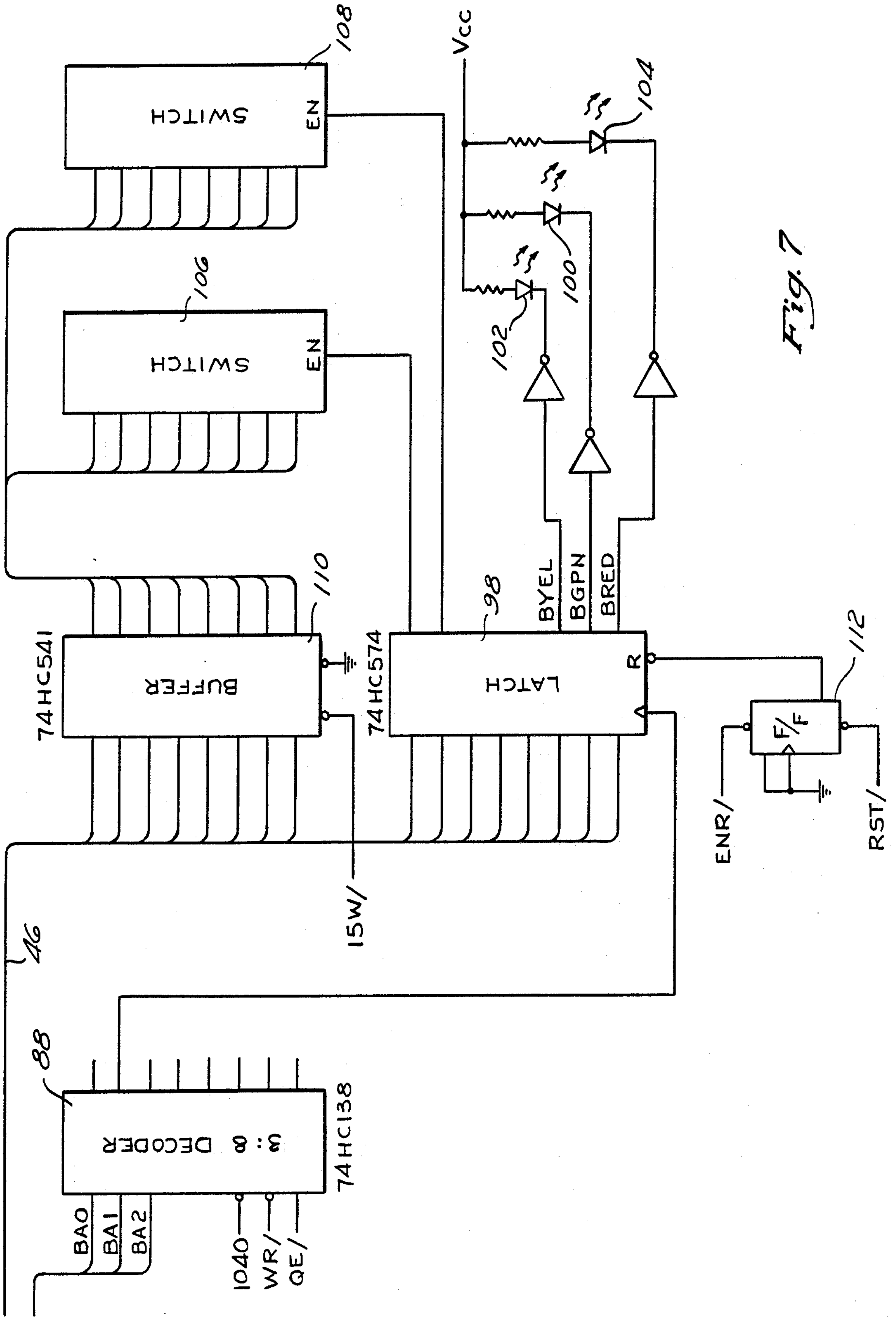
FIG. 7 is a detailed circuit diagram of decoder and buffer circuitry incorporated in the proximity protocol converter of FIG. 2.

A final portion of the circuitry incorporated in the proximity protocol converter 30 is shown in FIG. 7. This circuitry includes the third three-to-eight decoder 88 of which only a single output is used to enable a latch 98. A number of logic signals are provided to the latch 98 from the data bus 46 and selectively cause three light-emitting diodes (LED) 100, 102, 104 to be activated and a pair of switches 106, 108 to be enabled. The diodes, which include a green LED 100, a yellow LED 102, and a red LED 104, indicate the status of the operation of the proximity protocol converter 30. The settings of the two switches 106, 108 are periodically transmitted to the data bus 46 by a buffer 110 which is activated by the internal switch write (ISW/) signal. The settings of the switches 106, 108 specify the system code and the number of proximity readers 28 that are attached to the proximity multiplexer 26. The reset input R of the latch 98 is provided a reset signal generated by a flip-flop 112 which is connected to the system reset (RST/) signal and an enable reset (ENR/) signal.

The basic function of the proximity protocol converter 30 is to act as an interface between the central controller 24, the proximity multiplexer 26, and the feature modules 32. Each of these devices has a different message format. In order to allow the central controller 24 to communicate with the feature modules 32 and the proximity multiplexer 26, the protocol converter 30 must translate messages from one message format to another, depending upon which of the devices sent the message and which of the devices is to receive the message. The message formats for the central controller 24, the proximity multiplexer 26, and the feature modules 32 are explained in connection with FIGS. 8–10.

Now referring to FIG. 8, the message format for the proximity multiplexer 26 is shown. This message format includes a first field containing a start-of-transmission (STX) byte which indicates to the proximity multiplexer and the proximity protocol converter 30 that this is the start of a message. The second field is a two-byte LENGTH field which specifies how many bytes follow in the remaining fields 3–7. The third field includes the device number which indicates which of the proximity readers 28 a message is intended for or being transmitted from. The fourth field includes a function code which describes why the message is being sent and what the message contains.

Now referring to the function table 114 in FIG. 8, the function code 64 indicates that identification (ID) and system (SYS) code data is being transmitted with the message, and that the five data bytes include this ID & SYS code information. Function code 66 indicates that the proximity reader 28 is to be reset. There are no data bytes transmitted with this function code. These function codes are represented in hexadecimal form; for example, the function code 64 is represented by the binary string 0110, 0100. Unless otherwise indicated, all of the information in the message formats described hereinafter is represented in hexadecimal form.

The fifth field is the data field which contains the data that is being transmitted with the message. This data field is of variable length and may not include any data at all. The sixth field includes a checksum (CSUM) byte that contains the checksum corresponding to the preceding bytes of information. Checksums are well-known, and are used by a device receiving a data message to determine whether the message was sent correctly. The final field includes an end-of-transmission (ETX) byte to indicate to the proximity multiplexer that the transmission is terminated.

The message format for the feature modules 32 is different than the message format of the proximity multiplexer 26. Now referring to FIG. 9, the message format for the feature modules 32 includes a first SYNC field which is one byte long and indicates that a message follows. The second field is a device number field that contains the number of the feature module.

The third field is a command/response field that contains a code indicating what type of message is being transmitted. During the normal operation of the security system, certain types of messages are sent from the protocol converter 30 to the feature modules 32. These messages include a GO message which is a command that originates from the host controller 24 telling a feature module 32 to unlock the door because a valid identification card was presented to the card reader 28. Another command that is normally transmitted to a feature module 32 is a NO-GO message that indicates that the feature module 32 is not to unlock the door because valid identification data was not presented to the card reader 28. Two additional messages LOCK and UNLOCK command the feature module 32 to lock and unlock the door, respectively. A CHECK IDEK message causes the feature module 32 to check a security code entered into a keypad by the person seeking access, as described in more detail below. The codes corresponding to the GO, NO-GO, LOCK, UNLOCK, and CHECK IDEK messages are set forth in the Commands To Feature Module Table 116 in FIG. 9.

There are also a number of messages that are transmitted from the feature modules 32 to the central controller 24, which is also referred to herein as "host" or "host controller," via the protocol converter 30. These messages include a CORRECT IDEK message and a WRONG IDEK message that include five bytes of ID and SYS code data. There are two types of card readers commonly used in a security system. One type of card reader, or "standard" reader, authorizes access based only on the ID and SYS codes encoded in the card. Another type of card reader, referred to as an "IDEK" reader, includes a standard reader as well as a keypad. In order to gain access, one must present a card having the correct ID and SYS codes and also must enter a security code through the keypad as well. Where an IDEK reader is used, the ID and SYS codes on the card will be checked by the host 24, and the security code entered into the keypad will be checked by the feature module 32. A WRONG IDEK message indicates that the person seeking entry did not enter the proper security code, and a CORRECT IDEK message indicates that the proper security code was entered. Each of these two IDEK messages is followed by the five bytes of ID and SYS codes in the fourth field which is the data field. The feature modules also send DOOR LOCKED and DOOR UNLOCKED messages to the host controller 24, which indicate that the door is locked or unlocked, respectively. The function codes corresponding to the CORRECT IDEK, WRONG IDEK, DOOR LOCKED, and DOOR UNLOCKED messages are set forth in the Responses From Feature Module Table 118 in FIG. 9.

The final two fields of the feature module message format include cyclic-redundancy-check (CRC) bytes which are generated based on the bytes of information which preceded them and are used by a receiving device to determine if the message was correctly sent.

The central controller 24 has two different data formats, depending upon whether it is transmitting messages or receiving messages. Now referring to FIG. 10*a*, the host 24 transmits messages in a single-byte format which includes a 4-bit function code field and a 4-bit device number field. Now referring to the Transmit Function Table 120 in FIG. 10*a*, the GO, NO-GO, LOCK, and UNLOCK messages described above are represented by the hexadecimal function codes A, 9, B, and C, respectively. The device number is a 4-bit field which indicates which device the message is intended for.

The host 24 also receives certain messages from the feature modules 32 and proximity multiplexer 26 via the protocol converter 30. These messages have a format that includes a first 4-bit field that indicates to the central controller which type of device the message was transmitted from. For example, a standard reader is a Type 4 device and an IDEK reader is a Type 5 device. The next field in the message format is a 4-bit device number field that indicates which device number is transmitting the message to the host 24. The third field is a 4-bit field that includes the function code of the message, and the last field is the data field.

Now referring to the Receive Function Table 122 in FIG. 10*b*, the DOOR LOCKED and DOOR UNLOCKED messages described above are sent by both Type 4 standard readers and Type 5 IDEK readers, and are represented by the codes 3 and 4, respectively, in each type of reader. The CORRECT IDEK and WRONG IDEK messages described above are transmitted only by Type 5 IDEK readers and are represented by the codes 0 and F, respectively, and are followed by 3½ bytes of data. The ID & SYS CODE message includes identification code and system code data that is transmitted by a standard Type 4 card reader, and is also followed by 3½ bytes of ID and SYS code data.

In order for the proximity protocol converter 30 to facilitate communication among the central controller 24, the feature modules 32, and the proximity multiplexers 26, the various commands and responses just described need to be translated into a form each of the devices can understand. This is accomplished by the proximity protocol converter 30 with the use of function code translation tables that translate function codes from one format to another format so that each of the devices can properly decode the messages.

Now referring to FIG. 11, a Host-FM Translation Table 124 includes function code translations for the GO, NO-GO, LOCK DOOR, and UNLOCK DOOR messages that are transmitted by the host 24 to the feature modules 32 via the protocol converter 30. For example, the GO command that is transmitted from the host 24 to the protocol converter 30 is represented by the function code A as indicated by the host transmit message format shown in FIG. 10*a*. Since this A function code would not be understood by the feature modules 32, the protocol converter 30 translates the message function code from an A to the two hexadecimal bytes 99, 03 as indicated in the Commands To Feature Module Table 116 in FIG. 9 so that the feature modules 32 will understand that the message is a GO command. The function code translations for the NO-GO, LOCK DOOR, and UNLOCK DOOR messages are made in a similar fashion based upon the Host Transmit Function Table 120 in FIG. 10*a* and the Commands To Feature Module Table 116 in FIG. 9.

Messages that are typically sent from the feature modules 32 to the host 24 also need to be translated by the proximity converter 30. An FM-Host Translation Table 126 is also shown in FIG. 11, and includes function code translations for the CORRECT IDEK, WRONG IDEK, DOOR LOCKED and DOOR UNLOCKED messages described above. These translations are based on and can be understood with reference to the responses from Feature Module Function Code Tables 116, 118 shown in FIG. 9 and the Host Receive Function Table 122 shown in FIG. 10*b*.

A third translation table used by the protocol converter is a Proximity Multiplexer-Host Translation Table 128. This translation table 128 translates the proximity multiplexer ID and SYS CODE message, which has a function code 64, to a function code 0 as indicated in the Host Receive Function Table 122 in FIG. 10*b*.

The proximity protocol converter 30 accomplishes its overall communication functions with the use of a computer program stored in the EPROM 38 and executed by the central processing unit 36. The computer program, an overview of which is shown in FIG. 12, includes a number of software modules which interact with each other to accomplish the basic overall function. A multiplexer communication (MXCOM) module 130 transmits bytes of messages to the proximity multiplexer. The MXCOM module 130 interfaces with a multiplexer driver (MXDRV) module 132 which interfaces the MXCOM module 130 to a multiplexer protocol converter (MXPCNV) module 134 which does a portion of the function code translation described above. The MXPCNV module 134 communicates with a host communication (HCOM) module 136 that transfers message bytes to and from the central controller 24. The MXPCNV module 134 also communicates with a feature module protocol converter (FMPCNV) module 138 that accomplishes the remainder of the function code translations described above. The FMPCNV module 138 also communicates with the HCOM module 136 as well as a feature module driver (FMDRV) module 140. The FMDRV module 140 interfaces with a feature module communications (FCOM) module 142 that sends and receives bytes of messages to and from the feature modules 32.

In order to facilitate the explanation of the operation of the proximity protocol converter computer program and the interaction of the software modules, a brief description of the operation of the system during a typical transaction will be described in connection with FIGS. 1 and 12. Now referring to FIG. 1, when a person presents his or her card to a proximity reader 28, the proximity reader receives the ID and SYS code data transmitted by the card and transmits this data to the proximity multiplexer 26. The proximity multiplexer 26 transmits the data to the proximity protocol converter 30. At this point, one of two operations follows.

First, if the proximity reader 28 is a standard reader and does not include a keypad for the entry of a security code, the proximity protocol converter 30 transmits the identification data to the central controller 24, which searches its memory to determine if the identification and system codes are present. If the ID and SYS codes are present in the memory, the central controller 24 sends a GO command to the feature module 32 via the proximity protocol converter 30. As a result, the feature module 32 will cause the door unlock relay to become energized, and the person will be granted access.

During the operation just described, the flow of data through the software modules in FIG. 12 is as follows. The ID and SYS code data originates at the proximity multiplexer in FIG. 12 and is transmitted to the MXCOM module 130, the MXDRV module 132, the MXPCNV module 134, and the HCOM module 136 to be transmitted to the central controller 24. After the central controller 24 checks its memory to determine whether the ID and SYS codes are present, a message is transmitted down the right branch of FIG. 12, including the HCOM module 136, the FMPCNV module 138, the FMDRV module 140, and the FCOM module 142 for transmission to the feature module 32 which will then open the door if the message was a GO command.

The operation of the security system is somewhat different when an IDEK reader is utilized. In this latter case, after a person presents his card to the proximity reader 28, the ID and SYS codes are transmitted to the proximity multiplexer 26 and then transmitted to the proximity protocol converter 30. However, instead of immediately transmitting this information to the central controller 24, the proximity protocol converter 30 sends a CHECK IDEK message to the feature module 32, which enables the keypad so that the person may enter his or her security code. After the feature module 32 checks the security code, it will send either a CORRECT IDEK or WRONG IDEK message to the proximity protocol converter 30. The protocol converter 30 will then transmit this message to the central controller 24 in the appropriate message format, and the central controller 24 will search its memory for the ID and SYS codes if the CORRECT IDEK message was received. If a WRONG IDEK message was received, then the central controller 24 will simply send a NO-GO command to the feature module 32 via the proximity protocol converter 30.

During the operation just described, the ID and SYS codes again originate at the proximity multiplexer 26 and are transmitted up the left branch of FIG. 12 including the MXCOM module 130, the MXDRV module 132, and the MXPCNV module 134. At this point, instead of an ID & SYS CODE message being transmitted to the HCOM module 136, a CHECK IDEK message is formed by the FMPCNV module 138, and the security code entered by the person seeking access is checked. After the security code is checked, the appropriate IDEK message will be transmitted up the right branch of FIG. 12 to the central controller 24 and then back down the right branch of FIG. 12 after the controller 24 has granted a GO or a NO GO command. With this general understanding of the two basic types of operation of the security system, the individual software modules are explained in more detail below.

The FCOM, HCOM, and MXCOM software modules 130, 136, 142 operate as state machines. The operation of a state machine can be described with reference to a state diagram that indicates which state the software module is currently in and the next state that the software module will be in, depending upon what input is received. State diagrams are conventional and are widely used by computer programmers.

In the following description, the terms "characters" and "bytes" are used interchangeably. Now referring to FIG. 13, a state diagram 144 corresponding to the host communication (HCOM) software module 136 is shown. The HCOM module 136 can be in any of five states, H0, H1, H2, H3, and H4, at any particular time, as indicated by the state table 146. The H0 state is an out-of-synchronism state in which the HCOM module 136 is in if it is out of synchronism with the central controller 24. In the H1 state, the HCOM module 136 is waiting for a header character, such as a SYNC byte. In the H2 state, the HCOM module 136 is waiting for a message-length character, or byte, that will indicate how long the message is. In state H3, in which state the HCOM module 136 will be if the message is of known length, the module 136 is waiting for the last character of the message. In state H4, the HCOM module 136 is waiting for the end of a message of unknown length.

Now referring to the state diagram 144, if the HCOM module 136 is out of synchronism, it will be in state H0, regardless of how many characters it receives, until a time out is generated, in which case it will be transferred to state H1. In state H1, the HCOM module 136 is ready to receive messages. These messages may be one-byte messages, multi-byte messages of known length, or multi-byte messages of unknown length. In the case of one-byte messages, the module 136 receives or transmits the character, and remains in state H1 in order to wait for another message. If the message is of known length, the module 136 transfers to state H2 in order to wait for the message-length character. Upon receipt of the message-length character, the module 136 transfers to state H3, in which state it receives or transmits the remaining bytes of the message until the message is over, as indicated by a zero byte-count signal.

Alternatively, instead of progressing through states H2 and H3, the HCOM module 136 may transmit or receive multi-byte messages of unknown length. In this case, the module 136 remains in state H4 as each character is transmitted until a time-out is generated. A timeout indicates that the HCOM module 136 senses no activity for more than a predetermined period of time and, in the case of state H4, signifies that the message has ended. The state transition table 148 completely specifies the state diagram 144, indicating all possible current states and inputs to those states and the next states to which the module 136 will proceed, depending upon the input.

State diagrams specifying the MXCOM module 130 are shown in FIGS. **14*a* and 14*b*. Two state diagrams are necessary for the MXCOM module 130 since it utilizes full-duplex communication, in contrast to the other two communication HCOM and FCOM modules 136, 142 in which half-duplex communication is used. A state diagram 150 corresponding to the receive portion of the MXCOM module 130 is shown in FIG. 14*a*. Now referring to the state table 152 shown in FIG. 14*a*, there are four receive states: a first receive state R0 in which the module 130 is waiting for a SYNC byte or a STX byte. In state R1, the module 130 is waiting for a STX byte, which is a start transmission byte. In state R2, the module 130 is waiting for an end-of-transmission byte, or ETX byte. In state R3, the MXCOM module 130** is waiting for the transmission line to become idle after having detected an error in the transmission it was receiving.

Now referring to the state diagram 150 and the state transition table 154 in FIG. **14*a*, the MXCOM module 130 begins in state R0 and upon receiving a SYNC signal, it transfers to state R1, and further upon receiving an STX byte, transfers to state R2. Alternatively, beginning in state R0, the MXCOM module 130 may transfer directly to state R2 upon the receipt of an STX byte. In state R2, the message is being received, and the module 130 transfers back to state R0 upon receipt of the EOM signal. Regardless of whether the MXCOM module 130** is in state R0, R1, or R2 when it receives a message error, it automatically transfers to state R3 in order to wait for the transmission line to become idle, at which point it transfers to R0 and waits for the message to be retransmitted.

The state diagram for the transmit portion of the MXCOM module 130 is shown in FIG. 14*b*. Now referring to the state table 156 in FIG. 14*b*, the MXCOM module 130 may be in any of four states. In state X0, transmission is disabled, and the module 130 must wait until it detects that the transmission line is idle before it can transfer to state X1. In state X1, the module 130 is waiting for a transmission request. In state X2, the module 130 is waiting for an acknowledgment. In state X3, the module 130 is waiting for a ETX byte.

Now referring to the state diagram 158 and the state transition table 160, before a transmission can begin, the module 130 in state X0 must detect that the transmission line is idle, in which case it transfers to state X1. The MXCOM module 130 uses a hand-shaking scheme in which a transmit request must be sent before a message can be transmitted. Accordingly, the module 130 is in state X1 until it sends a transmission request, at which point it transfers to state X2. If the transmission request is not acknowledged, then the module 130 transfers from state X2 back to state X1. If the transmission request is acknowledged, the module 130 transfers to state X3 in which state the message is transmitted. While the message is being transmitted, the message is echoed back to the original sender of the message, and in the case of an invalid echo, the module 130 transfers from state X3 to state X1. When the module 130 is in of states X1, X2, or X3, upon detection of an EOT byte, the module 130 transfers to state X0.

The FCOM module 142 is illustrated by means of a state diagram 162 in FIG. 15. Now referring to the state table 164 in FIG. 15, the FCOM module 142 may be in any of five states. In state S0, the transmission line is idle and a transmit request may be made, in which case the module 142 transfers to state S1. In state S1, a message is transmitted. In state S2, a message is received. In state S3, the module 142 is in an error state, and in state S4, the module 142 is transmitting a not-acknowledged signal, or NAK.

Now referring to the state diagram 162 and the state transition table 166, when in state S0, the transmission line is idle and a transmit request may be sent, in which case the module 142 transfers to state S1 in order to transmit the message. When the message has been transmitted, the module 142 transfers to state S2 in order to receive a message. If the message is received, the module 142 transfers to state S0 to start the process over. If the module 142 does not receive a message in response to the message it transmitted in a predetermined period of time, the module 142 times out and transfers from state S2 to state S0 so that it can retransmit the original message. If the module 142 is in state S2 and detects an ACIA error, the module 142 transfers to state S3, which is an error handler state.

After transferring to state S3, the module 142 performs an error retry, then transfers to state S4 in which it transmits a NAK indicating that the message was not properly received while in state S2, and then the module 142 transfers back to state S2 in order to try to receive the message again. If another ACIA error is detected, the module 142 transfers to state S3 and the error process just described is repeated two more times, and if the errors persist, after three retries the module 142 transfers to state S0.

The feature module protocol converter (FMPCNV) module 138 of the proximity protocol converter computer program of FIG. 12 is shown in detail in FIG. 16. The FMPCNV module 138 translates messages sent from the host 24 to the feature modules 32, messages sent from the feature modules 32 to the host 24, and messages sent from the proximity multiplexer 26 to the feature modules 32. Now referring to FIG. 16, at step 168, the FMPCNV module 138 waits for a message. After a message has been received, at step 170, the FMPCNV module 138 determines whether the message was transmitted from the host 24. If the message was transmitted from the host, then FMPCNV module 138 translates the message into a format that the feature module 32 can understand at step 172. This translation is accomplished using the function code translation tables shown in FIG. 11. Next, at step 174, the FMPCNV module 138 sends the message to the feature module 32, and then returns to step 168 to wait for another message.

If the message was not from the host 24, the FMPCNV module 138 branches to step 176 to determine whether the message was from the feature module 32. If the message was from the feature module 32, the program translates the message into a format that the central controller 24 will understand at step 178, and then sends the message to the central controller 24 at step 180, and then returns to step 168 to wait for another message.

If the message was not from the central controller 24 or the feature module 32, at step 182, the FMPCNV module 138 determines if the message was sent by the proximity multiplexer 26. If it was sent by the multiplexer 26, the FMPCNV module 138 forms a CHECK IDEK message, and transmits the message to the feature module 32, and finally returns to wait for another message at step 168. If the message was not from the host 24, the feature module 32, or the proximity multiplexer 26, then the module 138 takes no action and branches back to step 168 to wait for another message.

A flowchart of the multiplexer protocol converter (MXPCNV) module 134 of FIG. 12 is shown in FIG. 17. At step 188 in FIG. 17, the MXPCNV module 134 waits for a message. After receiving a message, at step 190, the module 134 determines whether the message was sent from the multiplexer driver module 132. If the message was not sent from the multiplexer driver module 132, then the message was not intended for the MXPCNV module 134, and the program branches back to step 188 to wait for another message. If the message was sent from the multiplexer driver 132, then the program proceeds to step 192 in order to translate the message, again using the function code translation tables set forth in FIG. 11. In this case, the message is translated into the central controller message format.

Next, at step 194, the program determines whether the card reader 28 is a standard reader or an IDEK reader. If a standard and not an IDEK reader is being used, then the program branches to step 196 and sends the message to the host controller 24, since no additional information is necessary. If the reader is an IDEK reader, then the program branches to step 198 to determine whether the IDEK option of the reader is enabled. If the IDEK option of the reader is disabled, the program branches to step 196 and sends the message to the host 24. If the IDEK option of the reader is enabled, then at step 200 the program sends the message to the FMPCNV module 138 in the central controller message format, which the FMPCNV module 138 will be able to translate into the message format for the feature module 32.

A flowchart of the feature module driver (FMDRV) module 140 of FIG. 12 is shown in FIG. 18. The FMDRV module 140 controls the flow of message between the feature module protocol converter (FMPCNV) module 138 and the feature module communications (FCOM) module 142. Now referring to FIG. 18, at step 202, the FMDRV module 140 waits for a message. Upon the receipt of a message, at step 204 the module 140 determines whether the message was sent from the host 24. If the message was sent from the host 24, the program branches to step 206 to determine whether the host 24 has requested an update of a Feature Module Table 208.

Now referring to FIG. 24, the Feature Module Table 208 is stored in the memory of the proximity protocol converter 30 and indicates the status of various conditions such as whether the door is currently locked, whether an IDEK reader is attached, whether the IDEK reader is enabled, etc. Now referring back to FIG. 18, if an update is required, the Feature Module Table 208 is updated at step 210 and the program continues to step 212 at which the program determines whether there is a message to be transmitted to a feature module 32. If there is a message for a feature module 32, the program branches to step 214 at which the message is sent to the FCOM module 142 for transmission to the feature module 32. At this point the program branch is back to step 202 to wait for another message.

Now returning back to step 204, if the message was not from the host 24, the program branches to step 216 in order to determine whether the message was sent from a feature module 32. If the message was not sent from a feature module 32, the program branches back to step 202 since the message was not intended for the FMDRV module 140.

If the message was transmitted from a feature module 32, three types of messages are possible including a status request, a Feature Module Table update, and a message to the host 24. At step 218 the program determines whether the message was a status request. In this case, the program branches to step 220 at which the Feature Module Table 208 is read and the desired information is transmitted to the FCOM module 142 at step 222 for transmission to the feature module 32. The program then branches to step 202 to wait for another message. If the message from the feature module 32 was not a status request, the program branches to step 224 to determine whether the message has requested an update of the Feature Module Table 208. If an update was requested, the Feature Module Table 208 is updated at step 226 and the program continues on to step 228 at which the program determines whether the message was a message for the host 24. In this case, the program branches to step 230 at which the message is sent to the FMPCNV module 138 so that the message can be converted into a format that the host 24 will understand, and the program continues on the step 202 to wait for another message.

A flowchart of the proximity multiplexer driver (MXDRV) module 132 is shown in FIG. 19. Initially at step 232, the MXDRV module 132 causes the proximity multiplexer 26 to be reset, and then continues to step 234 at which it waits for a message. After a message is received, the message is checked at step 236 to determine whether it was sent from the MXCOM module 130 in which case the program branches to step 238 so that the function code of the message can be checked. The function code will reveal whether the message includes ID and SYS codes. Next, at step 240, the program will branch to step 242 if the message contains ID and SYS codes. At this step 242, the message is sent to the MXPCNV module 134 so that it can be translated into the appropriate message format, and then the program branches back to step 234 to wait for another message.

Now referring back to step 236, if the message was not sent from the MXCOM module 130, the program branches to step 244 to determine whether the message was a time-out. If the message was a time-out, the proximity reader 28 is reset at step 246 and the program branches to step 234 to wait for another message. If the message was not a time-out, the program also branches back to step 234.

The feature modules 32 of FIG. 1 interface with the hardware of the security system such as the door lock and unlock relays, the keypad into which the security code is input, a number of alarm contacts which monitor whether the door is open or closed, a green light-emitting diode which indicates that access is granted, a red light-emitting diode that indicates that access has been denied, etc.

A detailed circuit diagram of one of the feature modules 32 is shown in FIGS. 20 and 21. Now referring to FIG. 20, the operation of a feature module 32 is controlled by a computer program stored in a memory 248 and executed by a central processing unit (CPU) 250. The CPU 250 selectively enables the devices to which it communicates via three address signals A13, A14, and A15. These address signals are supplied to a two-to-four decoder 252 shown in FIG. 21.

This decoder 252 generates three signals, one of which is an enable signal EN- supplied to the chip enable input CE of the memory 248 in order to enable the memory 248. The output enable input OE of the memory 248 is activated by a signal N1 generated by a NAND 254 gate via the inverted E and R/W- signals output by the CPU 250. The decoder 252 generates a second signal which is transmitted to a NAND gate 256 with complimented inputs, the output of which is transmitted to the chip enable input CE- of a buffer 258. The other input of the NAND gate 256 is connected to the output of the NAND gate 254. The third output signal of the decoder 252 is connected to the enable input of a second two-to-four decoder 260 whose two inputs are connected to the address signals A6 and A7 output from a buffer 262.

Depending upon the combination of the A6 and A7 signals, the decoder 260 generates outputs to a plurality of NAND gates which selectively activate a number of latches connected to the keypad, the alarm contacts, the door relay, etc. In particular, a first output of the decoder 260 is provided to a NAND gate 264 with complimented inputs, and the other input of the NAND gate 264 is supplied by the NAND gate 254. When the NAND gate 264 generates a logic 0 signal, a latch 266 latches data from an 8-bit switch (not shown) which is then transmitted to the CPU 250.

A second output of the decoder 260 is transmitted to another NAND gate 268 with complimented inputs also having an input connected to the NAND gate 254. When the output of the second NAND 268 gate is logic 0, a latch 270 connected to a second switch (not shown) is enabled and transmits the data from the switch to the CPU 250. The two 8-bit switches just described are set to include the device number of the proximity reader 28 to which the feature module 32 is attached and are also set to determine how long the door unlock relay is energized after a GO command is transmitted to the feature module 32.

A third output of the decoder 260 is supplied to a NAND gate 272 with complimented inputs that enables the keypad. When logic 0, the output of the NAND gate 272 enables a latch 274 connected to the keypad (not shown) into which the security code is input in an IDEK reader. This data is transmitted to the CPU 250 so that the security code entered can be checked to determine if it correct.

A fourth output of the decoder 260 is supplied to a NAND gate 276 with complimented inputs, the output of which is supplied to a latch 278 and activates the latch 278 so that the state of various alarm contacts is transmitted to the CPU 250. The second decoder output is also supplied to a NAND gate 280 having complimented inputs that activates a latch 282 that controls the lock and unlock door relays. The other input of the NAND gate 280 is supplied by a NAND gate 284 having a first R/W- input generated by the CPU 250 and a second inverted E input also generated by the CPU 250.

The P17 and P16 outputs of the CPU 250 selectively activate a green light-emitting diode (LED) and a red light-emitting diode (LED), respectively. These two LEDs (not shown) are used to indicate whether a person is being granted access after having presented his card to a proximity reader 28.

The operation of a feature module 32 is explained in connection to FIG. 22, which is a flowchart of the computer program stored in the memory 248 and executed by the CPU 250. This computer program communicates with the FCOM module 142 described above. Now referring to FIG. 22, at step 286, the program waits for a message, and then decodes the message at step 288. Any number of various messages are transmitted to the feature module 32, including a request for the entry of the IDEK security code, a GO or NO-GO command from the central controller 24, and LOCK and UNLOCK commands also from the central controller 24.

After the message is decoded, at step 290, if the function code corresponds to a CHECK IDEK command, the program branches to step 292 at which the data is input from the keypad. Next, at step 294, the security code data is checked to determine if it is correct. At step 296, the program branches to step 298 if the security code was correct. At this step 298, the feature module transmits a CORRECT IDEK message to the FCOM module 142, and then returns to step 286 to wait for another message. If the security code was not correct, the program branches to step 300 and transmits a WRONG IDEK message to the FCOM module 142 for transmission to the host 24, and then returns to step 286 to wait for another message.

Now referring back to step 290, if the message was not a CHECK IDEK message, then the program branches to step 302 to determine if the message was a GO command. If the message was a GO command, then the program branches to step 304 at which the green LED is activated, and the door is unlocked at step 306. When a GO command is received by the feature module 32, the door is unlocked for a predetermined period of time to allow the person seeking access to enter and then is locked again. Accordingly, at step 308 the feature module 32 waits for a predetermined period of time as determined by the feature module switch settings described above and then continues to step 312 at which the door is locked, and then branches to step 286 to wait for another message.

Now referring back to step 302, if the message is not a GO command, the program branches to step 314 in order to test whether the message is a NO-GO command. If the message is a NO-GO command, the program branches to step 316 at which the red LED is lighted indicating that access will not be granted, and the program branches back to step 286 to wait for another message.

If the message is not a NO-GO command, the program branches to step 318 at which the program determines if the message is an UNLOCK command. If the message is an UNLOCK command, the program branches to step 320 at which the door is unlocked, and then branches back to step 286 to wait for another message. Finally, if the command is not an UNLOCK command, the program branches to step 322 to determine whether it is a LOCK command. If it is a LOCK command, the program branches to step 324 at which the door is locked.

The operation of the security system is explained in connected with FIGS. 25*a*–25*d*, which include a flowchart of the operation of the system from the time a card is presented to a proximity reader 28 until access is either denied or granted, and the door is unlocked if access is granted. This flowchart includes the operation of standard proximity readers and IDEK readers, which also require a security code to be entered by the person seeking access as explained above. Included alongside the flowchart is a series of various messages which are generated in the security system during this operation. During the operation, these messages are translated from one of the message formats described above to another of the message formats described above, depending upon which device is transmitting the message and which device is receiving the message. Each of the messages shown in the right-hand portion of FIG. 25*a*–25*d* corresponds to the adjacent program step shown in the left-hand portion of FIG. 25*a*–25*d*.

Now referring to FIG. 25*a*, the operation begins when a card is presented to one of the proximity readers 28 at step 326. After the proximity reader 28 receives the ID and SYS codes from the card, the proximity reader sends this data to the proximity multiplexer 26 at step 328. For the purposes of explaining the operation, an ID code comprising two and one-half hexadecimal bytes 7,77,77 and a system code of two hexadecimal bytes 00, 01 will be used. These ID and SYS codes are shown in the right-hand portion of FIG. 25*a* adjacent step 328. In some messge formats, only the second byte of the system code is used.

After the proximity multiplexer 26 receives the ID and SYS codes from the reader 28, the multiplexer 26 incorporates them into its own message format at step 330. This message format, as is described in detail above, includes a first STX byte which happens to be the hexadecimal byte 02 and a two-byte length field 00,09 that indicates that 9 bytes follow the length field. The third field is a one-byte device number field and includes device #1, which is encoded in the ASCII byte 31 so that the numeral "1" may appear on a CRT screen (not shown), and will be used again by way of example throughout the explanation of this operation. The next byte is the function code 64 which indicates that the message contains ID and SYS code data. The ID and SYS codes follow the function code as well as a one-byte ckecksum and an end-of-transmission ETX byte, which in this case happens to be the hexadecimal number 03. After the message is converted into the format just described, the proximity multiplexer 26 transmits the message to the MXCOM module 130 shown in FIG. 12.

When the MXCOM module receives the message, at step 332 it checks the message using the ckecksum. The MXCOM module 130 then reformats the message by stripping the STX, LENGTH, CKS, and ETX fields and adding a new length field L. After the message has been reformatted, the MXCOM module 130 transmits the message to the MXDRV module 132. At step 334, when the MXDRV module receives the message, it adds an end-of-message byte, which in this case happens to be the hexadecimal number 3E, and then decodes the function code to determine where to transmit the message. In this case since the function code is 64 and corresponds to ID and SYS code data, the MXDRV module 132 knows that the message is intended for the MXPCNV module 134.

At step 336 the MXPCNV module 134 translates the message into a message format the central controller 24 can understand. In this case, the function code 64, which indicates ID and SYS code data to the multiplexer 26, is translated to the host receive format as indicated in FIG. 10*b* and explained above. In this case, the message format shown in FIG. 25*a* adjacent step 336 includes a CODE section with the hexadecimal numbers 4,1,0, the 4 representing the device type, the 1 representing the hexadecimal device number (translated from the ASCII byte 31 device number), and the 0 representing the presence of ID and SYS code data, as set forth in the Receive Function Table 122 in FIG. 10*b*. The MXPCNV module 134 also changes the length field L to 05 to indicate that 5 bytes follow, not including the end-of-message byte.

The program then proceeds to step 338 at which the Feature Module Table is accessed to determine if the proximity reader 28 to which the card was presented is a standard reader or an IDEK reader. In the case of a standard reader, the program branches to branch location B in FIG. 25*c*, and if the reader is an IDEK reader, the program branches to branch location A in FIG. 25*b*. As explained above, where a standard reader is used, various messages are transmitted up the left-hand branch of FIG. 12 to the central controller 24 and back down the right-hand branch of FIG. 12 to the feature module 32 to tell the feature module 32 whether to unlock the door or not. In the case of an IDEK reader, messages are transmitted up the left-hand branch to the MXPCNV module 134 and instead of going directly to the host 24, are transmitted down the right-hand branch of FIG. 12 before going to the host 24 so that the security code can be entered by the person seeking access and checked by the feature module 32.

Now referring to FIG. 25*b*, if the reader is an IDEK reader, then at step 340 the FMPCNV module 138 translates the message into the feature module message format, reformats the message, and sends the message to the FMDRV module 140. The message is translated using the function code translation tables shown in FIG. 11, and in this case the 410 code of the host receive format is translated into the device number 01 and the function code 99,30. The length field is also changed from 5 to 8 to indicate that there are three additional bytes.

Next, at step 342 the FMDRV module 140 checks the function code to determine whether to transmit the message to the FCOM module 142. In this case, since the function code 99,30 corresponds to a CHECK IDEK message, the FMDRV module 140 knows that it must transmit the message to the FCOM module 142. Next, at step 344, the FCOM module 142 adds a header byte and two cyclic-redundancy-check bytes and transmits the message to the feature module 32. In this case, the header byte happens to be the hexadecimal number 7E.

Next, at step 346 the feature module 32 checks the IDEK by enabling the keypad and reading the security code data entered by the person seeking access. Assuming that the proper security code was entered, the feature module 32 constructs a message including the header byte, the device number, the hexadecimal function code 50 indicating a CORRECT IDEK message, and the ID and SYS codes, as well as two CRC bytes. Then the message is sent to the FCOM module 142.

At step 348, the FCOM module 142 deformats the message by stripping the header byte and the two CRC bytes and adds a length byte 07 which indicates that 7 bytes follow it, not including the end-of-message byte added. Next, at step 350, the FMDRV module 140 checks the function code and then transmits the message to the FMPCNV module 138.

Now referring to FIG. 25*c*, at step 352 the FMPCNV module 138 translates the message into the host message format and transmits the message to the HCOM module 136. The function code translation is accomplished by making reference to the function code translation tables of FIG. 11, and in this case, the FM-To-Host Translation Table 126 is accessed so that the CORRECT IDEK code 50 is changed to the host function code 0, and a device Type 5 byte indicating an IDEK reader is added as well as a device number 1 byte to complete the code 510 as indicated in the message adjacent step 352, and the initial byte of the SYS code is stripped.

If the reader 28 to which the card was presented is a standard reader, then the program will branch to step 354 from branch point B. By executing branch B, the program eliminates the steps 340–352, which are necessary only to check the IDEK security code data. At step 354 the MXPCNV module 134 transmits the message to the HCOM module 136. This message, which is shown to the right of step 354, has been reproduced in FIG. 25*c* from the message in FIG. 25*a* adjacent step 336.

At step 356, the HCOM module 136 deformats and transmits either of the two messages shown in FIG. 25*c* adjacent step 356. Deformatting the message includes stripping the length and end-of-message bytes.

When the host 24 receives the ID and SYS codes, it accesses its memory to determine whether they are present in the memory. If present, the card is authorized for entry and the door is unlocked. However, before the memory is accessed, the program determines whether an ID translation is required. In a security access system that uses both insertion readers and proximity readers in accordance with the invention, the method of encoding the ID and SYS data may be different, one method being used for the an insertion reader and another being used for a proximity reader. As a result, the insertion ID code may be different from the proximity ID code, even though the two codes are for the same person.

Having dual identification codes may be undesirable since a significant amount of information is stored in connection with each identification code. This information may include the name of the person having that identification code, his or her social security number, the date, time, and location at which the person was last granted access, etc. If all of this information was stored for each of the two different identification codes, much information would be duplicated and memory storage wasted.

To prevent such duplication of information, an Identification Code Translation Table 358 shown in FIG. 23 is utilized in this embodiment of the invention where separate identification codes are provided for the insertion readers 22 and proximity readers 28. Now referring to FIG. 23, the left column of this table 358 includes a listing of proximity identification codes and the right column includes the insertion identification code that corresponds to each proximity identification code. The proximity ID codes are arranged in numerically increasing order so that the proximity ID portion of the table 358 can be searched extremely quickly using conventional search methods.

Now referring to FIGS. 23 and 25c, if an ID translation is required at step 360, an ID code translation is performed at step 362. In order to accomplish this translation, the ID Code Translation Table 358 is searched to locate the proximity code that was received by the proximity reader 28, and then the corresponding insertion ID code is retrieved, and all later memory transactions which store the various information described above take place only with respect to the insertion ID code. Of course, the table 358 entries could be switched and information could be stored in the memory in connection with the proximity ID codes.

Next, at step 364, the memory is checked for the presence of the ID and SYS codes. After checking the memory to determine whether the ID and SYS codes are present, at step 366 the host 24 issues an appropriate message to the HCOM module 136 for transmission to the feature module 32 instructing it whether to unlock the door. This message will be either a GO command or a NO-GO command as indicated to the right of step 366.

Now referring to FIG. 25d, after the HCOM module 136 receives the message from the host 24, at step 368 the HCOM module 136 formats the message and passes the message to the FMPCNV module 138 so that it can be translated into a message format that the feature module 32 will understand. The formatting of the message includes adding a one-byte length character and an end-of-message byte.

Next, at step 370, the FMPCNV module 138 translates the function code, reformats the message, and transmits the message to the FMDRV module 140. The function code is translated utilizing the function code translation tables shown in FIG. 11, and in this case the code Al shown in the GO command is translated into device number 01 and the feature module function code 99,03. The code portion 91 of a NO-GO command is translated into a device number 01 and a feature number module code 99,05. The reformatting of the message also includes changing the contents of the length byte.

At step 372, the FMDRV module 40 checks the function code to determine that it should transmit the message to the FCOM module 142. Next, at step 374, the FCOM module 142 reformats the message and transmits the message to the feature module 32. This reformatting includes adding a header byte 7E and stripping the end-of-message byte 3E and replacing it with two CRC bytes. Finally, at step 376, the feature module 32 momentarily unlocks the door if the host transmitted a GO command.

A second embodiment of the invention is shown in FIG. 26. This embodiment, which is a security system utilizing only proximity readers, includes a central controller 378 identical to the central controller 24 of the dual insertion and proximity reader system just described. The central controller 378 in FIG. 26 is shown connected to a pair of proximity protocol converters 380, which are connected to a number of daisy-chained feature modules 382 and a pair of multiplexers 384. The two multiplexers 384 are each connected to a pair of proximity readers 386. The proximity protocol converters 380, multiplexers 384, feature modules 382, and proximity readers 386 are identical to the corresponding devices in the proximity subsystem described in connection with the first embodiment described above, and the overall operation is also the same as described above.

This second embodiment is advantageous in that the proximity protocol converters 380 allow the proximity readers 386 to communicate with the central processor 378, which was designed to communicate with insertion readers. Without the proximity protocol converters 380, the proximity readers 386 would be unable to communicate with the central controller 378.

The embodiments of the invention described above may be used in connection with separate cards having identification data, each authorized person having one card for use exclusively with insertion readers and the other card for use exclusively with proximity readers. The invention may also be used in connection with a dual card that may be used in both insertion readers and proximity readers. Such a dual card is the subject of a pending patent application, entitled "Structure and Method of Making Combination Proximity/Insertion Identification Cards," (U.S. Ser. No. presently unknown), filed Aug. 17, 1987, invented by Steven Fraser, David Johnston, and Reece Metzger and assigned to the Assignee of this patent application, International, Inc., the disclosure of which is hereby incorporated by reference.

Modifications and alternative embodiments of the invention will be apparent to those skilled in the art in view of the foregoing description. Accordingly, this description is to be construed as illustrative only, and is for the purposes of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A security system in which access is selectively granted based upon identification data produced by a card presented to a card reader, said system comprising:
- a central controller with a memory;
- an insertion-type card reader coupled to said central controller, said insertion-type card reader receiving identification data from a card and transmitting the identification data to said central controller; and
- a proximity-type card reader coupled to said central controller, said proximity type card reader receiving identification data from a card and transmitting the identification data to said central controller,
- said central controller checking said memory after the receipt of identification data from one of said card readers to determine whether access should be granted.

2. A security system as defined in claim 1, additionally comprising a converter that converts the message format of said proximity-type card reader to the message format of said central controller.

3. A security system as defined in claim 2 wherein said central controller converts an identification code used in connection with a proximity-type card reader to an identification code used in connection with an insertion type card reader.

4. A method of granting access in a security system in which two identification codes exist for a single person, one of said identification codes corresponding to an insertion-type card reader and the other of said identification codes corresponding to a proximity-type card reader, said method comprising the steps of:

receiving a first identification code from a first type of card reader;

transmitting said first identification code to a central controller; and converting said first identification code to a second identification code, said second identification code being used in connection with a second type of card reader.

5. A method as defined in claim 4 wherein said first type of card reader is a proximity reader and said second type of card reader is an insertion reader.

6. A converter for a security system that allows proximity-type card readers to be used with a central controller compatible with insertion-type card readers, said converter converting the message format of a proximity-type card reader to the message format of the central controller and the message format of the central controller to the message format of the proximity card reader, said converter comprising:

first means for translating messages from a proximity reader message format to a central controller message format, said first means translating a DOOR-LOCKED message into a first message that includes the function code 3 in hexadecimal format, said first means translating a DOOR-UNLOCKED message into a second message that includes the function code 4 in hexadecimal format, and said first means translating an ID & SYS CODE message into a third message that includes the function code 0 in hexadecimal format; and second means for translating messages from a central controller message format to a proximity reader message format, said second means translating a GO message that includes the function code A in hexadecimal format into a fourth message, said second means translating a NO-GO message that includes the function code 9 in hexadecimal format into a fifth message, said second means translating a LOCK message that includes the function code B in hexadecimal format into a sixth message, and said second means translating an UNLOCK message that includes the function code C in hexadecimal format into a seventh message.

7. A method of translating messages to and from two message formats including a proximity reader message format and a central controller message format, said method comprising the steps of:

(a) translating messages from a proximity reader message format to a central controller message format comprising the steps of:

translating a DOOR-LOCKED message into a first message that includes the function code 3 in hexadecimal format, translating a DOOR-UNLOCKED message into a second message that includes the function code 4 in hexadecimal format, and translating an ID & SYS CODE message into a third message that includes the function code 0 in hexadecimal format; and (b) translating messages from a central controller message format to a proximity reader message format comprising the steps of:

translating a GO message that includes the function code A in hexadecimal format into a fourth message, translating a NO-GO message that includes the function code 9 in hexadecimal format into a fifth message, translating a LOCK message that includes the function code B in hexadecimal format into a sixth message, and translating an UNLOCK message that includes the function code C in hexadecimal format into a seventh message.

* * * * *

UNITED STATES PATENT AND TRADEMARK OFFICE

CERTIFICATE OF CORRECTION

PATENT NO. : 4,808,803

DATED : February 28, 1989

INVENTOR(S) : Louis H. Magler, Hei-Pen Yang and John Hor

It is certified that error appears in the above-identified patent and that said Letters Patent is hereby corrected as shown below:

Title page, item [73], correct name of Assignee from "Figgi International, Inc., Richmond, Va." to --Casi-Rusco Inc., Bocaa Raton, Florida--.

On line 7 of the Abstract, please correct "in-dentification" to --identification--.

One line 15 of the Abstract, please correct "approximate" to --appropriate--.

Column 13, line 10, please correct "a ETX" to --an ETX--.

Column 15, line 3, please correct "flow of message" to --flow of messages--.

Column 22, line 40, please correct "application, International, Inc." to --application, Figgie International, Inc.--.

Signed and Sealed this

Twenty-first Day of August, 1990

*Attest:*

HARRY F. MANBECK, JR.

*Attesting Officer*

*Commissioner of Patents and Trademarks*